(12) United States Patent
Taima et al.

(10) Patent No.: US 9,151,874 B2
(45) Date of Patent: Oct. 6, 2015

(54) NEAR-INFRARED REFLECTIVE FILM, METHOD FOR MANUFACTURING NEAR-INFRARED REFLECTIVE FILM, AND NEAR-INFRARED REFLECTOR

(75) Inventors: Yasuo Taima, Tokyo (JP); Shinichi Suzuki, Tokyo (JP); Takeo Arai, Tokyo (JP); Akihisa Nakajima, Tokyo (JP); Akihito Hisamitsu, Kanagawa (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 167 days.

(21) Appl. No.: 13/807,628

(22) PCT Filed: Jul. 7, 2011

(86) PCT No.: PCT/JP2011/065569
§ 371 (c)(1),
(2), (4) Date: Dec. 28, 2012

(87) PCT Pub. No.: WO2012/014654
PCT Pub. Date: Feb. 2, 2012

(65) Prior Publication Data
US 2013/0100523 A1    Apr. 25, 2013

(30) Foreign Application Priority Data

Jul. 24, 2010 (JP) ................. 2010-166591
Sep. 28, 2010 (JP) ................. 2010-216688
Dec. 9, 2010 (JP) ................. 2010-274490

(51) Int. Cl.
| F21V 9/04 | (2006.01) |
| F21V 9/06 | (2006.01) |
| G02B 5/22 | (2006.01) |
| G02B 5/26 | (2006.01) |
| G02B 5/20 | (2006.01) |
| G02B 1/10 | (2015.01) |
| B32B 17/10 | (2006.01) |
| G02B 5/28 | (2006.01) |
| C09D 5/33 | (2006.01) |
| C09D 7/12 | (2006.01) |
| G02B 5/08 | (2006.01) |

(52) U.S. Cl.
CPC . *G02B 1/10* (2013.01); *B32B 17/10* (2013.01); *B32B 17/10036* (2013.01); *B32B 17/10201* (2013.01); *B32B 17/10761* (2013.01); *C09D 5/004* (2013.01); *C09D 7/1216* (2013.01); *C09D 7/1266* (2013.01); *G02B 5/208* (2013.01); *G02B 5/282* (2013.01)

(58) Field of Classification Search
USPC ................. 252/582, 586, 587; 359/359, 584; 427/160, 162, 163.1; 524/204, 301, 524/382, 392
See application file for complete search history.

(56) References Cited

U.S. PATENT DOCUMENTS

2010/0256271 A1* 10/2010 Hasegawa et al. ............ 524/204

FOREIGN PATENT DOCUMENTS

| EP | 2-597-494 | | 5/2013 | |
| JP | 08-110401 | | 4/1996 | |
| JP | 2002-131531 Y | | 5/2002 | |
| JP | 2003-266577 | | 9/2003 | |
| JP | 2004-123766 | | 4/2004 | |
| JP | 2004-125822 | * | 4/2004 | ............. G02B 5/28 |
| JP | 2004-125822 Y | | 4/2004 | |
| JP | 2009-086659 | * | 4/2009 | ............. G02B 5/26 |
| JP | 2010-053200 | * | 3/2010 | ............. C09K 3/00 |
| JP | 2010-53200 Y | | 3/2010 | |
| JP | 2009-86659 | | 10/2010 | |

OTHER PUBLICATIONS

Supplemental European Search Report, EP 11 81 2246, dated Jul. 1, 2014 (8 pages).
Chinese Office Action, Chinese Patent Application No. 201180035575.1, dated Jul. 21, 2014 and English translation of Chinese Office Action (total of 22 pages).

* cited by examiner

*Primary Examiner* — Bijan Ahvazi
(74) *Attorney, Agent, or Firm* — Lucas & Mercanti, LLP

(57) ABSTRACT

The present invention provides a near-infrared reflective film and a near-infrared reflector, which can be used over large areas and are flexible, and have low haze and high visible light transmittance. The near-infrared reflective film comprises at least one unit composed of a high refractive index layer and low refractive index layer on a substrate, and is characterized in that the refractive index difference between an adjacent high refractive index layer and low refractive index layer is at least 0.1, and said high refractive index layer contains at least one type of compound (A) selected from: 1) a rutile-type titanium oxide having a volume-average particle diameter of not more than 100 nm; 2) a water-soluble polymer; and 3) the following group of compounds. Group of compounds: a carboxyl group-containing compound, hydroxamic acids, pyridine derivatives.

17 Claims, No Drawings

NEAR-INFRARED REFLECTIVE FILM, METHOD FOR MANUFACTURING NEAR-INFRARED REFLECTIVE FILM, AND NEAR-INFRARED REFLECTOR

CROSS REFERENCE TO RELATED APPLICATION

This Application is a 371 of PCT/JP2011/065569 filed on Jul. 7, 2011 which, in turn, claimed the priority of Japanese Patent Application No. 2010-166591 filed on Jul. 24, 2010, Japanese Patent Application No. 2010-216688 filed on Sep. 28, 2010, and Japanese Patent Application No. 2010-274490 filed on Dec. 9, 2010, all applications are incorporated by reference herein.

TECHNICAL FIELD

The present invention relates to a near-infrared reflective film which is excellent in near-infrared reflectivity, visible light transmissivity, and film flexibility, a method for manufacturing the near-infrared reflective film, and a near-infrared reflector provided with the near-infrared reflective film

BACKGROUND ART

In recent years, from the viewpoint of reduction of load applied on air conditioning equipment based on high concern for energy conservation measures, demands are increasing for near-infrared reflective films configured to be pasted on window glasses of buildings and vehicles so as to cut off penetration of heat rays of sunlight.

As methods of forming such a near-infrared reflective film, dry film-formation methods such as vapor deposition and sputtering are proposed so as to for a lamination film in which a high refractive index layer and a low refractive index layer are laminated alternately. However, the dry film-formation methods have disadvantages such as need to use a large-sized vacuum apparatus for film-formation, high production cost, difficulty in formation of a film with large area, and restriction on substrates limited to heat-resistant material.

It has been known to manufacture near-infrared reflective films by wet film-formation methods in place of the dry film-formation methods having the above advantages.

For example, Patent Document 1 discloses a method of preparing a high refractive index layer coating liquid by dispersing a heat hardenable silicone resin or ultraviolet hardenable acrylate resin each including metal oxides and metal compound particle in an organic solvent, and coating the high refractive index layer coating liquid onto a substrate so as to form a transparent lamination film by a wet type coating method employing a bar coater. Further, Patent Document 2 discloses a method of preparing a high refractive index layer coating liquid containing a rutile type titanium oxide, a heterocyclic system nitrogen compound (for example, pyridine), an ultraviolet hardenable binder, and an organic solvent, and coating the high refractive index layer coating liquid onto a substrate so as to form a transparent lamination film by a wet type coating method employing a bar coater.

In addition, Patent Document 3 discloses a method of laminating layers alternately by using a methanol dispersion slurry of spherical rutile type titanium dioxide grains and a methanol silica sol.

However, in the methods disclosed by Patent Document 1 and Patent Document 2, since an organic solvent is mainly used as the medium of the high refractive index layer coating liquid, a volume of the organic solvent is scattered, which causes environmental problems. Further, in the methods disclosed above, an ultraviolet hardenable binder and a heat hardenable binder is used as a binder, cured by ultraviolet or heat after formation of a high refractive index layer. Accordingly, the resultant film has physical properties which lack flexibility.

Furthermore, since the slurry in which rutile type titanium dioxide grains are dispersed in an organic solvent with a surface treating agent is used, there are problems of wide particle size distribution, uneven refractive index in a plane of a coated film, and color change of a coated film with time due to the influence of the surface treating agent.

Moreover, in the method described in Patent Document 3, since the film formation is achieved by binding among particles, the resultant film is brittle. In addition, in the high refractive index layer formed by binding among the rutile type titanium dioxide grains, there are problems that haze becomes high due to voids caused on the boundary surfaces of particles.

RELATED ART DOCUMENT

Patent Document

Patent document 1: Japanese Unexamined Patent Publication No. 8-110401 official report Patent document 2: Japanese Unexamined Patent Publication No. 2004-123766 official report Patent document 3: Japanese Unexamined Patent Publication No. 2003-266577 official report

SUMMARY OF THE INVENTION

Problems to be Solved by the Invention

The present invention is achieved in view of the above-mentioned problems, and an object of the present invention is to provide a near-infrared reflective film with possibility to enlarge an area, flexibility, low haze, and high visible light transmissivity, a method for manufacturing the near-infrared reflective film, and a near-infrared reflector provided with the near-infrared reflective film.

Means For Solving The Problems

An object of the present invention can be attained by the following constitution.

1. In a near-infrared reflective film which includes at least one unit constituted by a high refractive index layer and a low refractive index layer on a substrate and has a refractive index difference of 0.1 or more between the high refractive index layer and the low refractive index layer both neighboring on each other, the near-infrared reflective is characterized in that the high refractive index layer contains 1) a rutile type titanium dioxide with a volume average particle size of 100 nm or less, 2) a water soluble polymer, and 3) a compounds A being at least one kind selected from the following compound group.

Compound group: a carboxyl group-containing compound, hydroxamic acids, and a pyridine derivative.

2. The near-infrared reflective film described in Item 1 is characterized in that the compound A has a partial structure represented by the following general formula (1) or (2).

General Formula (1)

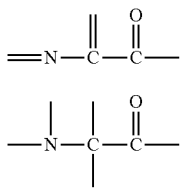

General Formula (2)

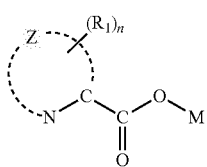

3. The near-infrared reflective film described in Item 1 or 2 is characterized in that the compound A is a compound represented by the following general formula (3).

General Formula (3)

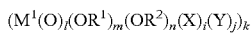

[In the above formula, Z represents a carbon atom or an atomic group required to form a five member ring or a six member ring together with a carbon atom. M expresses a hydrogen atom, an alkali metal atom, or an ammonium group; $R_1$ represents a hydrogen atom, a halogen atom, an alkyl group, an aryl group, an alkyl carvone amide group, an aryl carvone amide group, an alkyl sulfonamide group, an aryl sulfonamide group, an alkoxy group, an aryl oxy group, an alkylthio group, an arylthio group, an alkyl carbamoyl group, an aryl carbamoyl group, a carbamoyl group, an alkyl sulfamoyl group, an aryl sulfamoyl group, a sulfamoyl group, a cyano group, an alkyl sulfonyl group, an aryl sulfonyl group, an alkoxycarbonyl group, an aryloxy carbonyl group, an alkyl carbonyl group, an aryl carbonyl group, an acyloxy group, a carboxyl group, a carbonyl group, a sulfonyl group, an amino group, a hydroxy group, or a heterocycle group. The symbol n represents an integer of 0 to 4.

4. The near-infrared reflective film described in any one of Items 1 to 3 is characterized in that the water soluble polymer is at least one kind selected from a polymer having a reactive functional group, a polyvalent metal polymer represented by the following general formula (4), viscosity increasing polysaccharides, and gelatin.

$$(M^1(O)_i(OR^1)_m(OR^2)_n(X)_l(Y)_j)_k$$ General Formula (4)

[In the above formula, i and j each is 0 or 1, k is an integer of 2 or more, l, m, and n each is an integer of 0 to 2, and l+m+n=2. $M^1$ represents an aluminum atom, a zirconyl atom, or a hafnium atom. $R^1$ and $R^2$ each represents an alkyl group, an acyl group, or a hydrogen atom respectively, an may be the same with or differ from each other. X and Y each represents OH, a halogen atom, $NO_3$, $SO_4$, $CO_3$, $R^3COO$, or $H_2O$, and $R^3$ represents an alkyl group or a hydrogen atom.]

5. The near-infrared reflective film described in any one of Items 1 to 4 is characterized in that the water soluble polymer is gelatin and contains 1) a low molecular weight gelatin with an average molecular weight of 30,000 or less or collagen peptide in an amount of 15 weight % or more and 45 weight % or less to the total weight of the high refractive index layer and 2) a high molecular weight gelatin with an average molecular weight of 100,000 or more in an amount of 15 weight % or more and 40 weight % or less to the total weight of the high refractive index layer.

6. The near-infrared reflective film described in any one of Items 1 to 5 is characterized in that the high refractive index layer is formed by use of a high refractive index layer coating liquid that contains a water-based sol which contains the rutile type titanium dioxide with a volume average particle size of 100 nm or less and has a pH of 1.0 or more and 3.0 or less and a positive zeta potential, amino acids with an isoelectric point of 6.5 or less as the compound A, and the water soluble polymer.

7. In a near-infrared reflective film producing method for producing a near-infrared reflective film which includes at least one unit constituted by a high refractive index layer and a low refractive index layer on a substrate and has a refractive index difference of 0.1 or more between the high refractive index layer and the low refractive index layer neighboring on the high refractive index layer, the near-infrared reflective film producing method is characterized in that the high refractive index layer is formed by use of a high refractive index layer coating liquid which contains 1) a rutile type titanium dioxide with a volume average particle size of 100 nm or less, 2) a water soluble polymer, and 3) a compounds A being at least one kind selected from the following compound group.

Compound group: a carboxyl group-containing compound, hydroxamic acids, and a pyridine derivative.

8. The near-infrared reflective film producing method described in Item 7 is characterized in that the high refractive index layer coating liquid contains 1) a low molecular weight gelatin with an average molecular weight of 30,000 or less or collagen peptide in an amount of 15 weight % or more and 45 weight % or less to the total weight of the high refractive index layer and 2) a high molecular weight gelatin with an average molecular weight of 100,000 or more in an amount of 15 weight % or more and 40 weight % or less to the total weight of the high refractive index layer.

9. The near-infrared reflective film producing method described in Item 7 or 8 is characterized in that the high refractive index layer is formed by use of a high refractive index layer coating liquid that contains a water-based sol which contains the rutile type titanium dioxide with a volume average particle size of 100 nm or less and has a PH of 1.0 or more and 3.0 or less and a positive zeta potential, amino acids with an isoelectric point of 6.5 or less as the compound A, and the water soluble polymer.

10. A near-infrared reflector characterized by having the near-infrared reflective film described in any one of Items 1 to 6 on at least one surface side of a substrate.

Effect of the Invention

Employment of a water-based refractive index forming coating liquid according to the present invention enables to provide a near-infrared reflective film with possibility to enlarge an area, flexibility, low haze, and high visible light transmissivity, a method for manufacturing the near-infrared reflective film, and a near-infrared reflector provided with the near-infrared reflective film.

EMBODIMENT FOR CARRYING OUT THE INVENTION

Hereafter, the embodiment for carrying out the present invention will be explained in detail. As a result of intensive studies in view of the above problems, the present inventor conceives that in a near-infrared reflective film which includes at least one unit constituted by a high refractive index layer and a low refractive index layer on a substrate and has a refractive index difference of 0.1 or more between the high refractive index layer and the low refractive index layer neighboring on the high refractive index layer, the near-infrared reflective is characterized in that the high refractive index layer contains 1) a rutile type titanium dioxide with a volume average particle size of 100 nm or less, 2) a water soluble polymer, and 3) a compounds A being at least one kind selected from the above-mentioned compound group. And then, the present inventor found out that it becomes possible to realize a near-infrared reflective film with possibility to enlarge an area, flexibility, low haze, and high visible light transmissivity by use of a water-based refractive index formation coating liquid, via the employment of the above near-infrared reflective film, which results in the present invention.

That is, as mentioned above, conventionally, in a method of forming a high refractive index layer in which metal oxide particles are dispersed in a resin binder, the high refractive index layer is formed by using a high refractive index layer coating liquid in which an organic solvent is used mainly as medium. However, there are problems in uniformity of film thickness and environmental adaptability.

Conventionally, a high refractive index layer coating liquid containing resin polymer and metal oxide particles (for example, titanium oxide particles) has not been adopted as a water-based coating liquid because of the following reasons. At the time of formation of coated film by use of a water-based high refractive index layer coating liquid, during the solidification of the coated film in a dry process, wave-like marks (such phenomena may be also referred to as blowing unevenness) are caused on the surface of the coated film by dry air, which spoils the flatness of the coated film. Further, it has been difficult to disperse titanium oxide particles stably in a water-soluble polymer solution being a water-based medium.

As a result of intensive studies for the above problems, the present inventor conceived to employ at least one kind of carboxyl group-containing compounds such as aminocarboxylic acids, amino polycarboxylic acid, aliphatic carboxylic acids (mono, di, tri, tetracarboxylic acids), aromatic carboxylic acids, and their derivatives; pyridine derivatives; and hydroxamic acids; together with a water soluble polymer and rutile type titanium oxides as a water-based high refractive index layer formation coating liquid, thereby enabling rutile type titanium oxides to be dispersed stably in a water-based medium containing a water-soluble polymer and ensuring the viscosity increasing ability as a coating liquid at the time of low temperature. As a result, it becomes possible to obtain a uniform coated film without causing blowing unevenness on the formed coated film at the time of drying of the coated film, and to obtain a near-infrared reflective film excellent in environmental adaptability.

Hereafter, description will be given in detail for the constitutional elements of the near-infrared reflective film of the present invention and embodiments for carrying out the present invention.

<<Near-Infrared Reflective Film>>

The near-infrared reflective film of the present invention is characterized in that at least one layer of a unit constituted by a high refractive index layer and a low refractive index layer on a substrate is stacked on a substrate and a refractive index difference between the high refractive index layer and the low refractive index layer neighboring on the high refractive index layer is 0.1 or more. Preferably, the near-infrared reflective film has a visible light transmissivity, specified in JIS R3106-1998, of 50% or more and includes a region with a reflectance more than 50% in a region with a wavelength of 900 nm to 1400 nm.

Generally, from the view point that an infrared reflectivity can be made higher with a small number of layers, the larger a refractive index difference between a high refractive index layer and a low refractive index layer is, the more desirable a near-infrared reflective film is In the present invention, at least one unit constituted by a high refractive index layer and a low refractive index layer is characterized in that a refractive index difference between the high refractive index layer and the low refractive index layer neighboring on high refractive index layer is 0.1 or more, preferably 0.3 or more, and more preferably 0.4 or more.

The reflectance of a specified wavelength region is determined by the refractive index difference between neighboring two layers and the number of laminated layers. Accordingly, as the refractive index difference becomes larger, the same reflectance can be acquired with a small number of layers. A required number of layers for a refractive index difference can be calculated by use of commercially-available optical design software. For example, in order to acquire an infrared reflectivity of 90% or more, if a refractive index difference is less than 0.1, the number of layers more than 100 layers is required. As a result, the productivity becomes lower, in addition, scattering on the boundary surfaces in the laminated layers becomes larger, the transparency becomes lower, and it becomes more difficult to manufacture the near-infrared reflective films without any trouble. From the viewpoint of improvement of the reflectance and lessening of the number of layers, although there is no upper limit in the refractive index difference, the refractive index difference may be limited actually to about 1.40.

Next, description will be given for a basic structural schema of a high refractive index layer and a low refractive index layer in the near-infrared reflective film of the present invention.

In the near-infrared reflective film of the present invention, at least one layer of a unit constituted by a high refractive index layer and a low refractive index layer disposed is laminated on a substrate. However, from the above viewpoints, a preferable number of the high refractive index layers and the low refractive index layers as a range of the total number of layers is 100 layers or less, that is, 50 units or less, more preferably 40 layers (20 units) or less, and still more preferably 20 layers (10 units) or less.

Further, in the present invention, the near-infrared reflective film is characterized in that a refractive index difference between the high refractive index layer and the low refractive index layer neighboring the high refractive index layer is 0.1 or more. However, in the case where each of the high refractive index layer and the low refractive index layer includes multiple layers, it is desirable that all the refractive index layers satisfy the requirement specified in the present invention. In this connection, the uppermost layer and the lowermost layer may be constituted to be out of the requirement specified in the present invention.

Furthermore, in the near-infrared reflective film of the present invention, a desirable refractive index of the high refractive index layer is 1.80 to 2.50, and more preferably 1.90 to 2.20. Also, a desirable refractive index of the lower refractive index layer is 1.10 to 1.60, and more preferably 1.30 to 1.50.

Moreover, in the near-infrared reflective film of the present invention, it is an indispensable requirement to add a rutile type titanium dioxide with a volume average particle size of 100 nm or less as a metal oxide to the high refractive index layer. However, it may be preferable to add the metal oxide into both layers of the high refractive index layer and the low refractive index layer. Also, although it is characterized to add a water soluble polymer and at least one kind of compounds A selected from the above-mentioned compound group into the high refractive index layer, the above compounds may be added also into the low refractive index layer.

In the present invention, the refractive index of each of the high refractive index layer and the low refractive index layer may be determined in accordance with the following ways.

A sample is prepared such that each refractive index layer to be subjected to measurement of a refractive index is coated in a single layer on a substrate and the coated base board is cut out into a size of 10 cm×10 cm. Thereafter, the refractive index of the sample is measured in accordance with the following ways. As a spectrophotometer, U-4000 type (manufactured by Hitachi, Ltd) is used. The reverse surface of the measurement surface of each sample was subjected to surface roughing treatment, and then further subjected to light absorbing treatment with black spray, so that light is prevented from being reflected on the reverse surface. The reflectance in a visible light region (400 nm to 700 nm) is measured at 25 points on each sample with a condition of five degree regular reflection, an average value is obtained from the 25 measurement values, and an average refractive index is determined from the measurement results.

[High Refractive Index Layer]

The high refractive index layer according to the present invention is characterized by containing 1) rutile type titanium dioxides with a volume average particle size of 100 nm or less, 2) a water soluble polymer, and 3) at least one kind of compounds A selected from the above-mentioned compound group.

(Rutile Type Titanium Dioxide)

Generally, in many cases, titanium oxide particles are used in a state of being applied with surface treatment for the purpose of suppressing photo-catalyst activity of particle surfaces and improving dispersibility into a solvent and the like. For example, well-know titanium oxide particles are treated to cover their surfaces with a covering layer composed of silica such that particle surface are charged with negative charge, or with a covering layer composed of aluminum oxides such that particle surface with a pH of 8 to 10 are charged with positive charge.

The titanium oxide particle used in the present invention is characterized by being a rutile type (tetragonal type) titanium oxide particle with a volume average particle size of 100 nm or less.

Herein, the Volume average particle size means the volume average particle size of primary particle or secondary particles dispersed in a medium, which may measured by a laser diffraction/scattering method, a dynamic light scattering method, or the like.

The volume average particle size of the rutile type titanium dioxide grains according to the present invention is characterized by being 100 nm or less. However, it is preferably 4 to 50 nm, and more preferably 4 to 30 nm. If the volume average particle size is 100 nm or less, it is preferable in the view points of small haze and excellent visible light transmissivity. The titanium oxide particle with the volume average particle size of greater than 100 nm cannot be called proper one used for a high refractive index layer without being limited to the present invention.

The volume average particle size of the titanium oxide particles according to the present invention may be determined in the following ways. The size of each of 1,000 arbitral particles are measured by a laser diffraction scattering method, a dynamic light scattering method, a method of observing particles actually through an electron microscope, or a method of observing the images of particles appearing on a cross section or surface of a refractive index layer through an electron microscope. From the measurement results, a group of titanium oxide particles is formed such that particles with particle sizes of $d_1, d_2 \ldots d_i \ldots d_k$ exist by $n_1, n_2 \ldots n_i \ldots n_k$, respectively in number. In the group, in the case where a volume per one particle is represented with vi, the above volume average particle size is an average particle size which is represented by the following formula and weighted with volume:

Volume average particle size my=$(\Sigma(v_i \cdot d_i))/(\Sigma(v_i))$

Further, the titanium oxide particle according to the present invention is desirably monodispersity. Herein, the mono-monodispersity means that the degree of mono-monodispersity determined by the following formula is 40% or less. The degree of mono-monodispersity is more preferably 30% or less, and particularly preferably 0.1 to 20%.

Degree of mono-monodispersity=(standard deviation of particle size)/(average value of particle size)×100

<Producing Method of titanium Dioxide Sol>

In a method of producing a near-infrared reflective film according to the present invention, at the time of preparation of a water based high refractive index layer coating liquid, it is preferable to use a water-based titanium oxide sol which has a pH of 1 or more and 3 or less and includes titanium particles with a positive zeta potential, as rutile type titanium oxide.

Generally, in many cases, titanium oxide particles are used in a state of being applied with surface treatment for the purpose of suppressing photo-catalyst activity of particle surfaces and improving dispersibility into a solvent and the like. For example, well-know titanium oxide particles are treated to cover their surfaces with a covering layer composed of silica such that particle surface are charged with negative charge, or with a covering layer composed of aluminum oxides such that particle surface with a pH of 8 to 10 are charged with positive charge. In the present invention, it is desirable to use the water-based sol of titanium oxides which are not subjected to such surface treatment, has a pH of 1.0 to 3.0 and a positive zeta potential.

Examples of the method of preparing rutile type titanium dioxide sol usable to the present invention may be referred in Japanese Unexamined Patent Publication Nos. 63-17221, 7-819, 9-165218, 11-43327, 63-17221, 7-819, 9-165218, and 11-43327.

Other examples of the method of producing rutile type titanium dioxide according to the present invention may be referred to p255-258 (2000) in "Titanium oxide physical-properties and applied technology" by Manabu SEINO, published by GIHODO SHUPPAN Co., Ltd., and Method in Process (2) described at paragraph 0011 to 0023 of WO2007/039953 (JP Sakai Chemical).

The production method by the above process (2) includes a process (1) of treating a titanium dioxide hydrate with at least one kind of basic compounds selected from a group consisting of the hydroxide of an alkali metal and the hydroxide of an alkaline earth metal, and thereafter a process (2) of treating the obtained titanium dioxide dispersed material with a carboxylic acid group-containing compound and an inorganic acid. In the present invention, the water-based sol of the rutile type titanium dioxide with a pH of 1 to 3 adjusted with the inorganic acid, which is obtained by the process (2), can be used (Water Soluble Polymer)

The high refractive index layer according to the present invention is characterized by containing water soluble polymers, such as polyvinyl alcohol, in addition to the rutile type titanium dioxide and the compound A.

In the water soluble polymer of the present invention, when the water soluble polymer is dissolved in water with a concentration of 5 weight % at a temperature at which the water soluble polymer can be dissolved by the possible largest quantity, an amount of insoluble matter separated by filtration at the time of filtration with a G2 glass filter (the maximum pore size: 40 to 50 μm) is 50 weight % or less to the added amount of the water soluble polymer.

The water soluble polymer according to the present invention is preferably at least one kind selected from 1) a polymer having a reactive functional group, 2) a polyvalent metal polymer represented by the following general formula (4), 3) thickening polysaccharides (including: cellulose), and 4) gelatin.

<1) Polymer having a Reactive Functional Group>

As the water soluble polymer usable in the present invention, polymers having a reactive functional group may be employed. Examples of the polymers include acrylic resins, such as polyvinyl alcohol, polyvinyl pyrrolidones, polyacrylic acid, acrylic acid-acrylic nitrile copolymer, potassium acrylate-acrylic nitrile copolymer, vinyl acetate acrylic ester copolymer and an acrylic acid-acrylic ester copolymer; styrene acrylic acid resins, such as styrene acrylic acid copolymer, styrene methacrylic acid copolymer, styrene methacrylic acid-acrylic ester copolymer, styrene-α-methylstyrene acrylic acid copolymer, and styrene-a-methylstyrene acrylic acid-acrylic ester copolymer; vinyl acetate based copolymers; such as styrene sodium styrenesulfonate copolymer, styrene 2-hydroxyethyl acrylate copolymer, Styrene 2-hydroxyethyl acrylate-styrene sulfonic acid potassium copolymer, styrene maleic acid copolymer, styrene maleic anhydride copolymer, vinylnaphthalene-acrylic acid copolymer, vinylnaphthalene-maleic acid copolymer, vinyl acetate maleate copolymer, vinyl acetate crotonic acid copolymer and vinyl acetate acrylic acid copolymer; and salts of them. Of these, preferable examples include polyvinyl alcohol, polyvinyl pyrrolidones, and copolymer containing them.

The weight average molecular weight of the water soluble polymer is preferably 1,000 or more and 200,000 or less, and more preferably 3,000 or more and 40,000 or less.

Examples of the polyvinyl alcohol preferably used in the present invention include modified polyvinyl alcohols, such as terminally cationically-modified polyvinyl alcohol and anionically-modified polyvinyl alcohol with an anionic group in addition to ordinary polyvinyl alcohol obtained through hydrolysis of polyvinyl acetate.

The polyvinyl alcohol obtained through hydrolysis of polyvinyl acetate has preferably an average degree of polymerization being 1,000 or more, and particularly preferably an average degree of polymerization being in a range of 1,500 to 5,000. Further, the degree of saponification is preferably 70 to 100%, and particularly preferably 80 to 99.5%.

Examples of the cationically-modified polyvinyl alcohol include the polyvinyl alcohol disclosed in Japanese Unexamined Patent Publication No. 61-10483 which has primary to tertiary amino group or quaternary ammonium group on its main chain or side chain, and the cationically-modified polyvinyl alcohol can be obtained through saponification of a copolymer of an ethylenically-unsaturated monomer with a cationic group and vinyl acetate.

Example of the ethylenically-unsaturated monomer with a cationic group include trimethyl-(2-acrylamide 2,2-dimethylethyl)ammonium chloride, trimethyl-(3-acrylamide 3,3-dimethylpropyl)ammonium chloride, N-vinylimidazole, N-vinyl-2-methylimidazole, N-(3-dimethylaminopropyl) methacrylamide, hydroxyl ethyl trimethyl ammonium chloride, trimethyl-(2-methacrylamide propyl)ammonium chloride, and N-(1,1-dimethyl-3-dimethylaminopropyl) acrylamide. In the cationically-modified polyvinyl alcohol, a ratio of a cationically-modified group-containing monomer to vinyl acetate is 0.1 to 10 mol %, and preferably 0.2 to 5 mol %.

Examples of the anionically-modified polyvinyl alcohol include polyvinyl alcohol with an anionic group as described in PA (Japanese Unexamined Patent Publication No.) 1-206088, copolymer of vinyl alcohol and vinyl compound with a water-soluble group as described in JPA 61-237681 and PA 63-307979, and modified polyvinyl alcohol with a water-soluble group as described in JPA 7-285265.

Further, examples of the nonionically-modified polyvinyl alcohol include polyvinyl alcohol derivative in which a poly alkylene oxide group is added to a part of polyvinyl alcohol as described in PA 7-9758, and a block copolymer of a vinyl compound with a hydrophobic group and vinyl alcohol as described in PA 8-25795. Two kinds or more of polyvinyl alcohols different in degree of polymerization and kind of modification may be used in combination.

In the present invention, in the case where a polymer with a reactive functional group is used, a hardening agent may be used In the case where the polymer with a reactive functional group is polyvinyl alcohol, boric acid, its salt and an epoxy-based hardening agent may be preferable.

Further, in the present invention, as the water soluble polymer, at least one kind selected from a compound represented by the following general formula (4), thickening polysaccharides, and gelatin may be used independently, or in combination with a water soluble polymer with a reactive functional group, such as the above-mentioned polyvinyl alcohol so as to constitute a binder for a high refractive index layer.

<2) Polyvalent Metal Polymer Represented by a General Formula (4)>

$$(M^1(O)_l(OR^1)_m(OR^2)_n(X)_i(Y)_j)_k \qquad \text{General formula (4)}$$

In the above general formula (4), i and j each is 0 or 1, k is an integer of two or more, and l, m, and n each is an integer of 0 to 2, and l+m+n=2. M' represents an aluminum atom, zirconyl atom, or hafnium atom. $R^1$ and $R^2$ represent each an alkyl group, acyl group, or hydrogen atom, may be the same to or may be different from each other. X and Y each represents OH, a halogen atom, $NO_3$, $SO_4$, $CO_3$, $R^3COO$, or $H_2O$, and $R^3$ represents an alkyl group or hydrogen atom.

Further, from the viewpoint that durability is improved more, t is desirable that the polyvalent metal polymer represented with the general formula (4) includes a repeating unit represented by the following general formula (5) or (6).

General Formula (5)

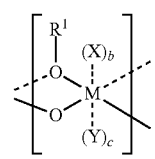

-continued

General Formula (6)

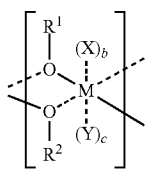

In the above general formula (5) or (6), b and c each is 0 or 1. M, $R^1$, $R^2$, X, and Y each is synonymous with them in the general formula (4). A solid line represents a covalent bond, and a broken line represents a coordinate bond, an ionic bond, or a covalent bond.

In the polyvalent metal polymer according to the present invention, in the general formulas (5) and (6), X, Y, b, and c may have two or more different kinds of repeating units.

In the above general formulas (4) to (6), it is desirable that M is a zirconyl atom or aluminum atom.

In the above general formula (5), it is desirable that M is a zirconyl atom, $R^1$ is a hydrogen atom, and X is OH.

In the general formula (6), it is desirable that M is an aluminum atom, $R^1$ and $R^2$ each is a hydrogen atom, and, X is $H_2O$.

Specific examples of the inorganic polymer containing the zirconyl atom in the above general formulas (4) to (6), include: difluoride zirconyl, trifluoride zirconyl, tetrafluoride zirconyl, Hexafluoro zirconyl acid salt (for example, potassium salt), heptafluoro zirconyl acid salt (for example, sodium salt, potassium salt and ammonium salt), octafluoro zirconyl acid salt (for example, lithium salt), fluoridation oxidation zirconyl, dichloride zirconyl, trichloride zirconyl, tetrachloride zirconyl, hexachloro zirconyl acid salt (for example, sodium salt and potassium salt), an acid zirconyl chloride(zirconyl chloride), dibromide zirconyl, tribromide zirconyl, tetrabromide zirconyl, bromination oxidation zirconyl, triiodination zirconyl, hexaiodination zirconyl, hyperoxidation zirconyl, zirconium hydroxide, sulfuration zirconyl, zirconium sulfate, p-toluenesulfonic acid zirconyl, zirconium sulfate, zirconium sulfate, acid zirconium sulfate trihydrate, zirconium sulfate potassium, selenic acid zirconyl, zirconium nitrate, zirconium nitrate, phosphoric acid zyrconyl, carbonic acid zirconyl, carbonic acid zirconyl ammonium, acetic acid zirconyl, acetic acid zirconyl, acetic acid zirconyl ammonium, lactic acid zirconyl, citric acid zirconyl, stearic acid zirconyl, phosphoric acid zyrconyl, oxalic acid zirconyl, zirconyl isopropylate, zirconyl butyrate, zirconyl acetylacetonate, acetylacetone zirconyl butyrate, stearic-acid-zirconyl butyrate, zirconyl acetate, bis(acetyl acetonato) dichloro zirconyl, and tris(acetyl acetonato) chloro zirconyl.

Of these compounds, zirconyl chloride, zirconium sulfate, zirconium sulfate, acid zirconium sulfate trihydrate, zirconium nitrate, carbonic acid zirconyl, carbonic acid zirconyl ammonium, acetic acid zirconyl, acetic acid zirconyl ammonium, and stearic acid zirconyl are preferable. Further, carbonic acid zirconyl, carbonic acid zirconyl ammonium, acetic acid zirconyl, zirconium nitrate, and zirconyl chloride are more preferable. Furthermore, carbonic acid zirconyl ammonium, zirconyl chloride, and acetic acid zirconyl are especially preferable. Examples of the specific trade names of the above compounds include Zircozol ZA-20 (acetic acid zirconyl) manufactured by Daiichi Kigenso Kagaku Kogyo Co., Ltd., Zircozol ZC-2 (zirconyl chloride) manufactured by Daiichi Kigenso Kagaku Kogyo Co., Ltd., and Zircozol ZN (zirconium nitrate) manufactured by Daiichi Kigenso Kagaku Kogyo Co., Ltd.

The constitutional formulas of the typical compounds of the polyvalent metal polymer containing the above zirconyl atom are shown below.

Exemplary compound 1: zirconium nitrate

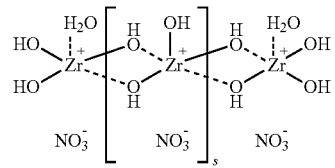

Exemplary compound 2: zirconium sulfate

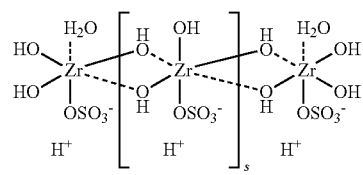

Exemplary compound 3: carbonic acid zirconyl ammonium

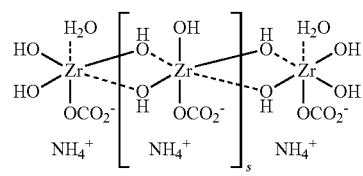

Exemplary compound 4: zirconium acetate

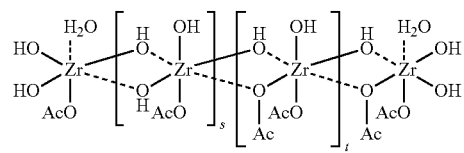

Herein, Ac represents an acetyl group ($CH_3CO$—).
Exemplary compound 5: zirconyl chloride (Zircozol ZC-2)

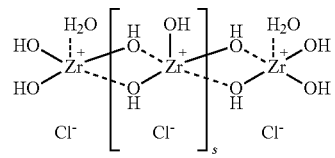

In the above formulas, s and t each represents an integer of one or more.

The polyvalent metal polymers containing a zirconyl atom may be used independently, or may be used in combination with two or more different kind compounds.

Further, specific examples of the polyvalent metal polymers containing an aluminum atom in the above general formulas (4) to (6) include aluminum fluoride, hexafluoroaluminate (for example, potassium salt), aluminum chloride, basic aluminum chloride (for example, poly aluminum chloride), tetrachloroaluminate (for example, sodium salt), aluminum bromide, tetrabromoaluminate (for example, potassium salt), aluminum iodide, aluminate (for example, sodium salt, potassium salt, calcium salt), aluminum chlorate, aluminum perchlorate, aluminum thiocyanate, aluminum sulfate, a basic aluminum sulfate, potassium aluminum sulfate(alum), aluminum ammonium sulfate(ammonium alum), sulfuric acid sodium aluminum, aluminum phosphate, aluminum nitrate, aluminum hydrogen phosphorate, aluminum carbonate, aluminum silicate polysulfurate, aluminum formate, aluminum acetate, aluminum lactate, aluminum oxalate, aluminum isopropylate, aluminum butyrate, ethyl acetate aluminum diisopropylate, aluminum tris(acetylacetonate), aluminum tris(ethylacetoacetate), and aluminum monoacetylacetonate bis(ethyl acetacetonate).

Of these, aluminum chloride, basic aluminum chloride, aluminum sulfate, basic aluminum sulfate, and basic aluminum silicate sulfurate are desirable, and basic aluminum chloride and basic aluminum sulfate are the most desirable. Examples of the specific trade names of the above compounds include Takibain #1500 which is poly aluminum chloride (PAC) and manufactured by Taki Chemical Co., Ltd., polyaluminum hydroxide (Paho) manufactured by Asada Chemical Industry Co., Ltd., and Purachem WT manufactured by Riken Green Co., Ltd., and various grades of them can be obtained.

The constitutional formula of Takibain #1500 is shown below.

Exemplary compound 6: basic aluminum chloride (Takibain #1500)

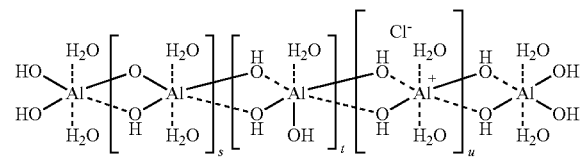

In the above formula, s, t, and u each represents an integer of one or more.

The added amount of the above polyvalent metal polymer is preferably 1 to 100 parts by weight to 100 parts by weight of inorganic oxide particles, and more preferably 2 to 50 preferably.

<3> Thickening Polysaccharides>

The thickening polysaccharides usable in the present invention are not specifically limited to, and examples of the thickening polysaccharides include natural simple polysaccharides, natural composite polysaccarides, synthetic simple polysaccharides, and the synthetic composite polysaccharides, which are generally known. The details of these polysaccharides may be referred to "Biochemistry Encyclopedia (the second edition) published by Tokyo Kagaku Dojin Co., Ltd.", and 21 page and the like of Volume 31st (1988) in "Food Industry".

The thickening polysaccharides used in the present invention means the polymer of sugars, and has characteristics to promote a viscosity difference between a viscosity at the time of low temperature and a viscosity at the time of high temperature. Further, by adding the thickening polysaccharides according to the present invention into a coating liquid containing metal oxide particle, viscosity increase is caused. The polysaccharides have a viscosity increasing ability such that the addition of the polysaccharides increases a viscosity at 15° C. by 1.0 mP·s or more, preferably 5.0 mP·s or more, and more preferably 10.0 mP·s or more.

Examples of the thickening polysaccharides applicable to the present invention, include: celluloses (for example, water soluble cellulose derivatives, such as carboxymethylcellulose (cellulose carboxy methyl ether), methyl cellulose, hydroxymethylcellulose, hydroxyethyl cellulose, and hydroxypropylcellulose; carboxylic acid group containing celluloses, such as carboxymethylcellulose (cellulose carboxy methyl ether), and carboxyethyl cellulose; cellulosic derivatives, such as cellulose nitrate, cellulose acetate propionate, cellulose acetate, and cellulose sulfate;); galactans (for example, agarose, and agaropectin), galactomannoglycan (for example, locust bean gum, and guaran), xyloglucan (for example, tamarind gum), glucomannoglycan (for example, konjac mannan, wood origin glucomannan, xanthan gum, etc.), galactoglucomannoglycan (for example, needle-leaf tree material origin glycan), arabinogalactoglycan (for example, soybean origin glycan, and microorganism origin glycan), glucorhamnoglycan (for example, and gellan gum), glycosaminoglycans (for example, hyaluronic acid, and keratan sulfate), alginic acid and alginate;) and natural polymer polysaccharides originating from red alga, such as agar, κ-carrageenan, λ-carrageenan, τ-carrageenan, and furcelleran. From the viewpoints of the characteristic not to lower the dispersion stability of metal oxide particles coexisting in a coating liquid, the constitutional unit of the thickening polysaccharides preferably does not have a carboxylic acid group and a sulfonic acid group. Preferable examples of such thickening polysaccharides include polysaccharides consisting of only pentose, such as L-arabinose, D-ribose, 2-deoxyribose, and D-xylose; or hexose, such as D-glucose, D-fructose, D-mannose, and D-galactose. Specifically preferably usable examples include: tamarind seed gum which is known as xyloglucan including glucose in a main chain and glucose also in a side chain; guar gum, cationized guar gum, hydroxy propyl guar gum, locust bean gum, and tam gum, which are known as galactomannan including mannose in a main chain and glucose in a side chain; and arabinogalactan which includes galactose in a main chain and arabinose in a side chain. In the present invention, tamarind, guar gum, cationized guar gum, and hydroxy propyl guar gum are especially preferable.

In the present invention, furthermore, two or more kinds of thickening polysaccharides may be used in combination.

The content of the thickening polysaccharides is preferably 5 weight % or more and 50 weight % or less, and more preferably 10 weight % or more and 40 weight % or less. However, in the case where the thickening polysaccharides are used in combination with a water soluble polymer, an emulsion resin, and the like, the content may be 3 weight % or more. If the content of the thickening polysaccharides is small, at the time of drying of a coated film, the tendency to cause disturbance of the coated surface and deterioration of transparency becomes large. On the other hand, if the content is 50 weight % or less, the relative content of metal oxide becomes appropriate, and it becomes easy to enlarge a refractive index difference between a high refractive index layer and a low refractive index layer.

<4> Gelatin>

The high refractive index layer according to the present invention preferably contains as the water soluble polymer 1) low molecular weight gelatin with an average molecular weight of 30,000 or less or collagen peptide in an amount of 15 weight % or more and 45 weight % or less to the total weight of the high refractive index layer, and 2) high molecular weight gelatins with an average molecular weight 100,000 or more in an amount of 15 weight % or more and 40 weight % or less.

As the gelatins applicable to the present invention, various gelatins having been conventionally widely used in the silver halide photosensitive material field may be applicable. Examples of the gelatins include: in addition to acid-treated gelatin and alkali-treated gelatin, enzyme-treated gelatin which is subjected to enzyme treatment in the production process of gelatin, and gelatin derivative, that is, modified gelatin which has an amino group, imino group, hydroxyl, and carboxyl group as a functional group in its molecule and is modified with a reagent having a group capable of reacting with the above groups. The general production methods of gelatin are known well, and may be referred to, for example, Item 55 in Fourth Edition of The Theory of Photographic Process by T. H. James 1977 (Macmillan), Items 72 to 75 in Science Photograph Manual (Upper part) published by Maruzen, pages 119 to 124 in Basic Silver-halide Photography of Photographing Engineering published by Corona. Further, the reference may be made to "gelatin" described in Item IX, Vol. 176, No. 17643 (December, 1978) in Research Disclosure.

<Low Molecular Weight Gelatin>

It is desirable that the low molecular weight gelatin or collagen peptide according to the present invention has an average molecular weight of 30,000 or less, and contains a high molecular weight gelatin component having a molecular weight of 100,000 or more in an amount of 1.0 weight % or less.

The collagen peptide used in the present invention means protein which is made not to exhibit sol-gel change though treatment to make gelatin into low molecular.

Although the low molecular weight gelatin or collagen peptide according to the present invention has an average molecular weight of 30,000 or less, the average molecular weight is more preferably 2,000 to 30,000, and specifically preferably 5,000 to 25,000.

The average molecular weight of the low molecular weight gelatin and the collagen peptide may be measured by gel filtration chromatography. The low molecular weight gelatin or the collagen peptide may be obtained by adding gelatin degrading enzyme in an aqueous solution of high molecular weight gelatin with n average molecular weight of about 100,000 so as to cause enzymatic degradation of the gelatin; by adding acid or alkali and heating to cause hydrolytic degradation of the gelatin; by irradiating ultrasound waves so as to cause degradation of the gelatin; or by using the above techniques in combination.

More specifically, the low molecular weight gelatin and the collagen peptide according to the present invention can be prepared as follows.

Usually-used high molecular weight gelatin with an average molecular weight of 100,000 or more is dissolved in water, followed by addition of gelatin degrading enzyme, thereby causing enzymatic degradation of gelatin molecule. This technique may be referred to the description on pages 233 to 251, pages 335 to 346 in Photographic Gelatin II (1976) by R. J. Cox. published by Academic Press, London. In this case, since bonding positions to be degraded (decomposed) by enzymes are predetermined, low molecular weight gelatin with a comparatively narrow molecular weight distribution is obtained, which is desirable. In this case, as the enzymatic degradation time is made longer, the molecular weight becomes lower more. In addition, there is a method to cause hydrolytic degradation by heating under an atmosphere of low pH (pH 1 to 3) or high pH (pH 10 to 12). If a average molecular weight exceeds 30,000, the effect of the present invention will decrease. With a average molecular weight of 2,000 or less, there are difficulties in production of gelatin or collagen peptide.

In the low molecule gelatin and collagen peptide according to the present invention, in order to degrade (decompose) sufficiently high molecular weight gelatin with an average molecular weight of 100,000 or more used as raw material in a preparation process of the low molecule gelatin or the collagen peptide, and to make the content of high molecular weight gelatin to be 1.0 weight % or less, it is preferable to set appropriately the conditions such as kinds of gelatin degrading enzyme, an added amount, a temperature and time at the time of enzyme degradation, so as to conduct enzyme degradation of high molecular weight gelatin molecules.

<High Molecular Weight Gelatin>

In the present invention, it is desirable that at least a high refractive index layer contains high molecular weight gelatin with an average molecular weight of 100,000 or more, and the average molecular weight of the high molecular weight gelatin is in a range of 100,000 or more and 200,000 or less.

The average molecular weight of the high molecular weight gelatin used in the present invention can be measured by Gel Permeation Chromatography method (GPC method) which is a general well-known procedure.

As described in P.35, Proceedings of the 4th IAG Conference by D. Lorry and M. Vedrines, September 1983, an 47,237 (1984) in Japan Photographic Science and Technology by Takashi Ono, Hiroyuki Kobayashi, and Shinya Mizusawa, the molecular weight of gelatin is generally composed of $\alpha$ components (molecular weight about 100,000) being a constitutional unit of collagen, $\beta$ component being its dimer, $\gamma$ component being its trimer, polymer amphoteric components being monomer, and further, low molecular weight components in which the above components are cut out irregularly.

The high molecular weight gelatin with an average molecular weight of 100,000 or more according to the present invention is mainly composed of an $\alpha$ component (molecular weight about 100,000) being a constitutional unit of collagen, a $\beta$ component being its dimer, and a $\gamma$ component being its trimer in the above components.

The molecular weight distribution of gelatin is measured by Gel Permeation Chromatography method as described in the above documents, further, in the documents of JPA (Japanese Unexamined Patent Publication Nos.) 60-80838, 60-87952, 62-87952, 62-265645, 62-279329, and 64-46742. In the present invention, the ratio of each molecular weight component of gelatin is determined by a GPC method on the following conditions.

a) Column: Asahipak, GS-620 (produced by Asahi Chemical Industry Co., Ltd.)

Two column series connection, Column temperature: 50° C.

b) Eluate: an equally-mixed solution of 0.1 mol/L of $KH_2PO_4$, and 0.1 mol/L of $Na_2HPO_4$ pH: 6.8, Flow rate: 1.0 ml/min.

c) Sample: 0.2% eluate solution of gelatin

Injection rate: 100 μl d) Detection: ultraviolet absorption spectrophotometer (UV wavelength: 230 nm)

In the waveform of a change of absorption at 230 nm during a retention time (Retention Time), first, a peak of an exclusion limit appears, then, respective peaks by a $\gamma$ component, a $\beta$ component, and an $\alpha$ component appear sequentially in this order, subsequently, as the retention time becomes loner, the waveform gradually decays. The molecular weight can be calculated from the retention time (Retention Time) of an outflux curve calibrated with a reference sample.

The α component is constituted by polypeptide chains with a molecular weight of about 100,000, and gelatin components, such as dimers (β components) of a chains, and trimers (γ components), form aggregates of gelatin molecules having various molecular weights. Gelatin with a prescribed average molecular weight may be available from gelatin manufacturers.

Further, examples of the methods of producing high molecular weight gelatins with an average molecular weight of 100,000 or more according to the present invention include the following methods.

1) In an extraction operation during production of gelatin, extracted material at a late stage is used, and extracted material (low molecular weight components) at an initial stage is removed.

2) In the above production method, treatment temperature in a process from extraction to dry is made less than 40° C.

3) Gelatin is subjected to dialysis treatment via cold-water (15° C.).

By use of the above methods independently or in combination, high molecular weight gelatin with an average molecular weight of 100,000 or more can be obtained.

The high refractive index layer according to the present invention is characterized by containing 1) low molecular weight gelatin or collagen peptide with an average molecular weight of 30,000 or less, and 2) high molecular weight gelatin with an average molecular weight of 100,000 or more. Herein, whether or not a high refractive index layer satisfies the above requirements specified in the present invention can be confirmed by the following ways.

First, a high refractive index layer constituting a near-infrared reflective film is isolated from the film Successively, the molecular weight distribution of gelatin in the isolated high refractive index layer is measured by the above Gel Permeation Chromatography method (GPC method), and the molecular weight of gelatin is plotted on a horizontal axis and the content is plotted on a vertical axis so as to form a molecular weight distribution curve. Then, the above confirmation is made from the judgment whether two maximum peaks in content appear separately in a region of a molecular weight of 30,000 or less and in a region of a molecular weight of 100,000 or more.

<Hardening Agent of Gelatin>

In the high refractive index layer coating liquid according to the present invention, in order to harden a gelatin coated film after a high refractive index layer has been formed, a hardening agent may be also added if needed.

As the hardening agent usable in the present invention, the well-known compounds currently used as a hardening agent of usual photographic emulsion layers may be employed. Examples of the hardening agent include organic hardening agents such as vinyl sulfone compounds, urea-formalin condensates, melanin formalin condensates, epoxy-based compound, aziridine-based compound, active olefins, and isocyanate-based compounds; and inorganic polyvalent metal salts, such as, chromium, aluminum, and zirconium.

(Compound A)

The high refractive index layer according to the present invention is characterized by containing the compound A selected from the following compound group together with the rutile type titanium dioxide and the water soluble polymer.

Compound group: carboxyl group containing compounds, hydroxamic acids, and pyridine derivatives.

Examples of the above carboxyl group containing compound, include: aminocarboxylic acids, amino polycathoxylic acids, aliphatic carboxylic acids (mono, di, tri, tetra-cathoxylic acids), aromatic carboxylic acids, and their derivatives.

Further, the compound A according to the present invention may be a polymer which makes the above compound group a constitutional unit.

In the present invention, it is desirable that the compound A according to the present invention is a compound which has a partial structure represented by the following general formula (1) or (2).

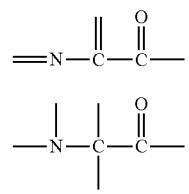

General Formula (1)

General Formula (2)

Further, it is desirable that the compound A according to the present invention is a compound represented with the following general formula (3).

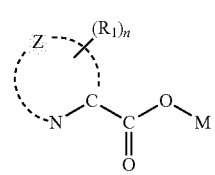

General Formula (3)

In the above general formula (3), Z represents a carbon atom or an atomic group required to form five member rings or six member rings together with a carbon atom. M represents a hydrogen atom, an alkali metal atom, or an ammonium group. R1 represents a hydrogen atom, halogen atom, alkyl group, aryl group, alkyl carvone amide group, aryl carvone amide group, alkyl sulfonamide group, aryl sulfonamide group, alkoxy group, aryl oxy group, alkylthio group, arylthio group, alkyl carbamoyl group, aryl carbamoyl group, carbamoyl group, alkyl sulfamoyl group, aryl sulfamoyl group, sulfamoyl group, cyano group, alkyl sulfonyl group, aryl sulfonyl group, alkoxycarbonyl group, aryloxy carbonyl group, alkyl carbonyl group, aryl carbonyl group, acyloxy group, carboxyl group, carbonyl group, sulfonyl group, amino group, hydroxy group, or heterocycle group. n represents an integer of 0 to 4. Further, the nitrogen atom which forms a heterocycle may have an N-oxide structure.

Hereafter, typical specific examples of the compound (A) according to the present invention are shown.

LI-1
$HN(CH_2COOH)_2$

LI-2
$CH_3N(CH_2COOH)_2$

LI-3

$\text{C}_6\text{H}_5\text{—N(CH}_2\text{COOH)}_2$

-continued

HOOCCH$_2$N(CH$_2$COOH)$_2$

HOOCCH$_2$CH$_2$N(CH$_2$COOH)$_2$

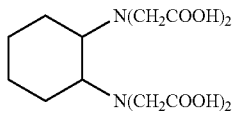

HOCH$_2$CH$_2$N(CH$_2$COOH)$_2$ (HOOCCH$_2$)$_2$NCH$_2$CH$_2$N(CH$_2$COOH)$_2$

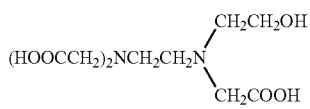

HOOCCH$_2$NHCH$_2$CH$_2$NHCH$_2$COOH

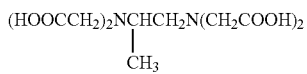

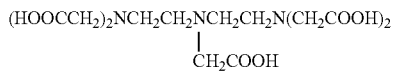

(HOOCCH$_2$)$_2$N(CH$_2$)$_3$N(CH$_2$COOH)$_2$

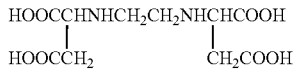

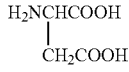

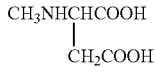

H$_2$NCH$_2$COOH

CH$_3$NHCH$_2$COOH (C$_2$H$_5$)$_2$NCH$_2$COOH (HOCH$_2$CH$_2$)$_2$NCH$_2$COOH

H$_2$NCH(CH$_2$COOH)$_2$

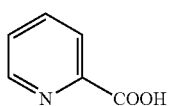

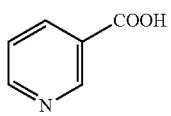

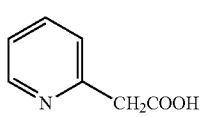

LI-4
LI-5
LI-6
LI-7
LI-8
LI-9
LI-10
LI-11
LI-12
LI-13
LI-14
LI-15
LI-16
LI-17
LI-18
LI-19
LI-20
LI-21
LI-22
LI-23
LI-24

-continued

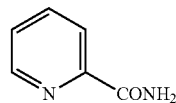

COOH
|
COOH

CH$_2$COOH
|
HO—C—COOH
|
CH$_2$COOH

CH$_2$(COOH)$_2$

HO—CHCOOH
|
HO—CHCOOH

CH$_3$C=CHCOCH$_3$
|
OH

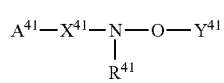

LI-25
LI-26
LI-27
LI-28
LI-29
LI-30
LI-31

Further, in addition to the compound exemplified in the above, a copolymer or graft polymer each containing 3-(4-vinylbenzyloxy)picolinic acid may be employed.

In the present invention, of the above exemplary compounds, L1-22 (picolinic acid) is specifically desirable.

These compounds A may be purchased as a reagent product, and are reported so many in abstract journals, and documents, such as Beilstein Handbuch der Organischen Chemie, Annaren der Chemie (Ann. Chem.), Chemical Abstracts (Chem. Abstr.), Journal of the American Chemical Society (J. Am. Chem. Soc.), Monatsh. Chem., and Journal der Russischen Physikalish-Chemischen Gesellschaft. Accordingly, the compounds A may be synthesized in accordance with methods described in the above documents.

Moreover, as the compounds A according to the present invention, hydroxamic acids may be employed. The hydroxamic acids according to the present invention are a compound represented by the following general formula [IV].

$$A^{41}-X^{41}-\underset{R^{41}}{N}-O-Y^{41}$$
General Formula (IV)

In the above formula, $A^{41}$ represents a hydrogen atom, substituted or un-substituted alkyl group, substituted or un-substituted aryl group, substituted or un-substituted amino group, substituted or un-substituted heterocycle group, substituted or un-substituted alkoxy group, substituted or un-substituted aryl oxy group, substituted or un-substituted carbamoyl group, substituted or un-substituted sulfamoyl group, acyl group, carboxy group, hydroxyamino group, or hydroxy aminocarbonyl group.

$X^{41}$ represents —CO—, —CS—, —SO$_2$—, or —SO—. $R^{41}$ represents a hydrogen atom, substituted or un-substituted alkyl group, or substituted or un-substituted aryl group. $A^{41}$ and $R^{41}$ may link to each other so as to form a ring structure. $Y^{41}$ represents a hydrogen atom or a group capable of becoming a hydrogen atom through hydrolysis reaction.

In the case where $A^{41}$ and $R^{41}$ are a group having a substituent group, examples of the substituent group include a halogen atom, aryl group, alkyl group, alkoxy group, aryl oxy group, hydroxy group, sulfonyl group, sulfonamide group, sulfamoyl group, sulfo group, amide group, ureido group, cyano group, hydroxy aminocarbonyl group, carboxy group, nitro group, amino group, alkoxycarbonyl group, aryloxy carbonyl group, alkylthio group, arylthio group, and heterocycle group (pyridyl group, morpholino group, and the like).

In the general formula [IV], $A^{41}$ represents preferably a hydrogen atom, or substituted or un-substituted alkyl group, aryl group, amino group, alkoxy group, or aryl oxy group, and especially preferably a substituted or un-substituted amino group, alkoxy group, or aryl oxy group. The number of carbons may be preferably 1 to 10. $X^{41}$ is preferably —CO—. $R^{41}$ is preferably a hydrogen atom.

Hereafter, the examples of the hydroxamic acids according to the present invention are shown. However, the present invention is not limited to these examples.

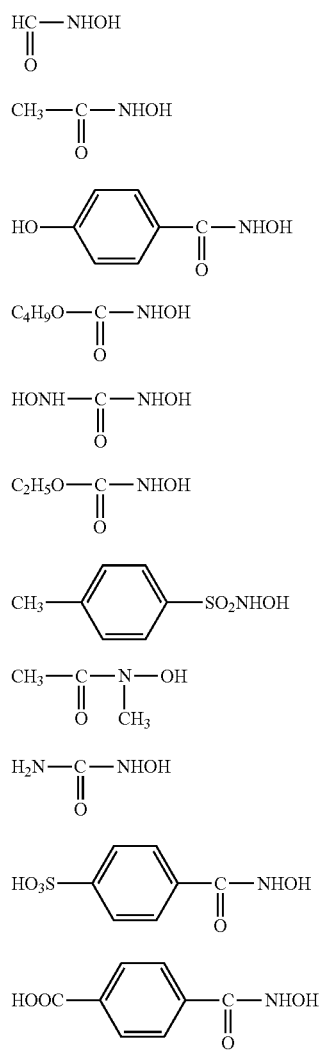
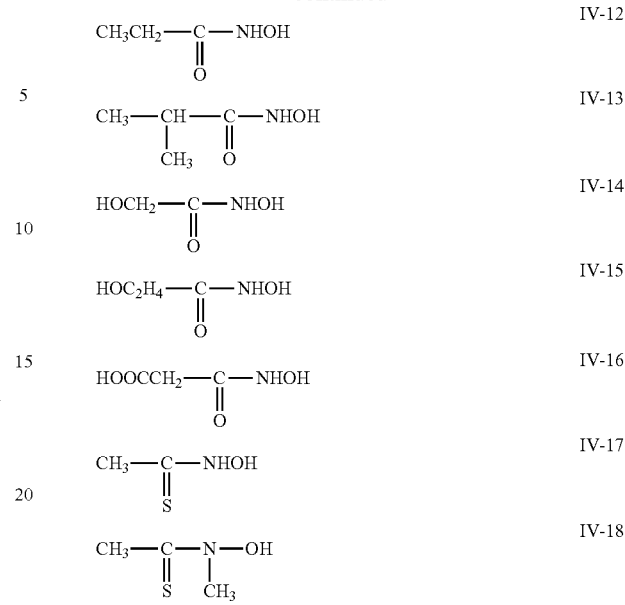

Further, as one of the carboxyl group containing compound specified as the compound A according to the present invention, it is desirable to use an amine compound, especially amino acid having an isoelectric point of 6.5 or less.

The amino acid used in the present invention is a compound which has an amino group and a carboxyl group in the same molecule, and may be any type of α-, β-, and γ-, but is preferably an amino acid having an isoelectric point of 6.5 or less. Although some of the amino acid has optical isomers, there is no difference in effect between the optical isomers. Any one of the optical isomers may be used independently or used as a racemic mixture.

The detailed description of the amino acid according to the present invention may be referred to the description on pages 268 to 270 in Encyclopaedia Chemical 1 Miniature Edition (Kyoritsu shuppan Co., Ltd.; issued on 1960).

Specific desirable examples of amino acid include aspartic acid, glutamic acid, glycine, and serine. Of these, glycine and serine are particularly preferable.

With regard to the isoelectric point of an amino acid, since an amino acid has a specific pH value at which positive charge and negative charge in the molecule of the amino acid are made balance with each other such that the total charge becomes zero, the isoelectric point means the specific pH value. In the present invention, amino acids having an isoelectric point of 6.5 or less are used. The isoelectric point of each amino acid can be obtained through isoelectric point electrophoresis at the low ionic strength.

An added amount of the compound A according to the present invention in the high refractive index layer is preferably in a range of 0.2 to 1.0 g to 1.0 g of titanium oxide, and more preferably in a range of 0.3 to 0.7 g to 1.0 g.

[Low refractive Index Layer]

The near-infrared reflective film of the present invention includes a low refractive index layer having a refractive index lower than that of the above-mentioned high refractive index layer. The low refractive index layer has preferably a refractive index of 1.6 or less, and more preferably a refractive index of 1.3 to 1.5.

In the low refractive index layer according to the present invention, metallic oxide particles are dispersed in a water soluble polymer. In this connection, the water soluble polymer used in the low refractive index layer may be same as that described in the above high refractive index layer. The respective water soluble polymers used in the low refractive index layer and the high refractive index layer may be the same with or different from each other. However, use of the same water soluble polymers for the both layers is preferable for the achievement of simultaneous multilayer coating.

In the low refractive index layer according to the present invention, as metallic oxide particles, silicon dioxide may be preferably used, and acid colloidal silica sol may be especially preferable.

In the present invention, the silicon dioxide has preferably an average particle size of 100 nm or less. The silicon dioxide dispersed in the state of primary particles has an average primary particle size (particle size in the state of dispersed liquid before coating) of preferably 20 nm or less, and more preferably 10 nm or less. Further, from the viewpoints that haze is small and visible light transmissivity is excellent, the silicon dioxide has preferably an average secondary particle size of 30 nm or less.

The average particle size of the metal oxide according to the present invention may be determined as follows. The very figure of each particle or the figure of each particle appearing on the cross section or surface of a refractive index layer is observed through an electron microscope so as to measure the particle size of each of 1,000 arbitral particles, and then, the average particle size is determined as a simple average value (number average) of the 1,000 measurements. At this time, the particle size of each particle is determined as the diameter of a circle equal to the projected area of each particle.

Further, the low refractive index layer according to the present invention may contain the water soluble polymer (water soluble polymer having a reactive functional group, compound represented by the general formula (4), thickening polysaccharides, and gelatin) described as the constitutional element of the high refractive index layer, the compound A, and the like.

[Other Additives]

In the high refractive index layer and low refractive index layer according to the present invention, various additives may be used if needed.

<Emulsion Resin>

In the present invention, it is desirable that the high refractive index layer or low refractive index layer according to the present invention further contains an emulsion resin.

The emulsion resin used in the present invention is resin fine particles produced such that oil-soluble monomer is kept at an emulsion state in an aqueous solution containing a dispersing agent, and then polymerized in emulsion by use of a polymerization initiator Examples of the dispersant used at the time of emulsion polymerization include generally: low molecular dispersants such as alkyl sulfonates, alkylbenzene sulfonates, diethylamine, ethylene diamine, and quartemary ammonium salt; and high molecular dispersants such as polyoxyethylene nonylphenyl ether, polyoxyethylene lauryl acid ether, hydroxyethyl cellulose, and polyvinyl pyrrolidone.

The emulsion resin according to the present invention is resin in which resin fine particles (average particle size of 0.01 to 2 μm) are dispersed in an emulsion state in a water-based medium, and is produced such that oil-soluble monomer is polymerized in emulsion by use of a high molecular dispersant with a hydroxyl group. A basic difference is not observed in the polymer composition of an obtained emulsion resin depending on the kind of a dispersant used for the emulsion resin. However, if the emulsion polymerization is made by use of a dispersant with a hydroxyl group, it is presumed that hydroxyl groups reside on at least the surface of fine particles. Accordingly, it is considered that the emulsion resin obtained by use of the dispersant with a hydroxyl group is different in chemical or physical properties of emulsion from the emulsion resin obtained by use of the other dispersants.

The high molecular dispersant with a hydroxyl group has a weight average molecular weight of 10,000 or more and is substituted with a hydroxyl group at its side chain or terminal. Examples of the high molecular dispersant include copolymer of 2-ethyl hexyl acrylate with acrylic polymer, such as sodium polyacrylate and polyacrylamide; polyether, such as polyethylene glycol and polypropylene glycol; and polyvinyl alcohol. Of these, polyvinyl alcohol is desirable.

Examples of the polyvinyl alcohol used as the high molecule dispersant include: in addition to ordinary polyvinyl alcohols obtained through hydrolysis of polyvinyl acetate, modified polyvinyl alcohols, such as cationically-modified polyvinyl alcohols, anionically-modified polyvinyl alcohols with an anionic group such as a carboxyl group, and silyl-modified polyvinyl alcohols with a silyl group. In the polyvinyl alcohol, as an average degree of polymerization becomes higher, the effect to prevent occurrence of cracks at the time of formation of an ink absorption layer becomes larger. However, the average degree of polymerization being 5,000 or less allows the viscosity of an emulsion resin to becomes not high, facilitates easy handling at the time of production. Accordingly, the average degree of polymerization is preferably 300 to 5,000, more preferably 1,500 to 5,000, and specifically preferably 3,000 to 4,500. The degree of saponification of the polyvinyl alcohol is preferably 70 to 100 mol %, and more preferably 80 to 99.5 mol %.

Examples of the resin polymerizes in emulsion by the above-mentioned high molecule dispersants include: ethylene monomers, such as acrylic acid ester, methacrylic acid ester, vinyl-based compound, and styrene-based compound; and homopolymers or copolymers of diene-based compounds, such as butadiene and isoprene. Specific examples include: an acrylic resin, styrene-butadiene type resin and ethylene-vinyl acetate type resin.

<Other Additives of Each Refractive Index Layer>

Examples of various kinds of additives applicable to the high refractive index layer and low refractive index layer according to the present invention include various known additives, such as:

ultraviolet absorbers described in PA. (Japanese Unexamined Patent Publication No.) 57-74193, 57-87988, and 62-261476;

color fading inhibitor, and various anion, cation, and non-ion surfactants described in WA. 57-74192, 57-87989, 60-72785, 61-146591, 1-95091, and 3-13376;

fluorescent whitener, described in PA. 59-42993, 59-52689, 62-280069, 61-242871, and 4-219266;

pH adjusters, such as sulfuric acid, phosphoric acid, acetic acid, citric acid, sodium hydroxide, potassium hydroxide, and potassium carbonate;

defoaming agent; lubricants such as diethylene glycol; antiseptics; antistatic agent; and matting agent.

[Substrate]

A substrate applied to the near-infrared reflective film of the present invention is preferably a film support. The film support may be transparent or may be opaque. Various resin films may be used as the film support. Examples of the resin films include: polyolefin films (polyethylene, polypropylene, etc.), polyester films (polyethylene terephthalate, polyethylenenaphthalate, etc.), polyvinyl chloride, and cellulose triacetate. Of these, polyester film is preferable. The polyester film (hereafter, merely referred to as polyester) is not specifically limited to. However, the polyesters have preferably a film forming ability which makes a dicarboxylic acid component and a diol component as main constitutional components. Examples of the dicarboxylic acid component of the main constitutional components include: terephthalic acid, isophthalic acid, phthalic acid, 2, 6-naphthalene dicarboxylic acid, 2,7-naphthalene dicarboxylic acid, diphenylsulfone dicarboxylic acid, diphenyl ether dicarboxylic acid, diphenylethanedicarboxylic acid, cyclohexanedicarboxylic acid, diphenyldicarboxylic acid, diphenylthioether dicarboxylic acid, diphenyl ketone dicarboxylic acid, and phenylindan dicarboxylic acid. Further, examples of the diol component include: ethylene glycol, propylene glycol, tetramethylene glycol, a cyclohexane dimethanol, 2,2-bis(4-hydroxyphenyl)propane, 2,2-bis(4-hydroxyethoxyphenyl)propane, bis(4-hydroxyphenyl)sulfone, bisphenol fluorenedihydroxyethyl ether, diethylene glycol, neopentylglycol, hydroquinone, and cyclohexanediol. Among the polyesters making these components as the main constitutional components, from the viewpoints of transparency, mechanical strength, and dimensional stability, polyesters preferably make terephthalic acid or 2,6-naphthalene dicarboxylic acid as a dicarboxylic acid component and ethylene glycol or 1,4-cyclohexane dimethanol as a diol component in the main constitutional components. Of these, polyesters which make polyethylene terephthalate or polyethylenenaphthalate as the main constitutional components; copolymerized polyesters composed of terephthalic acid, 2,6-naphthalene dicarboxylic acid, and ethylene glycol, and polyesters which makes a mixture of two or more kinds of the above polyesters as the main constitutional components are preferable.

The thickness of the film support according to the present invention is preferably 10 to 300 μm, and more preferably 20 to 150 μm. Further, the film support of the present invention may be composed of two laminated sheets, and in this case, the two laminated sheets may be the same or different in kind.

[Production Method of Producing a Near-Infrared Reflective Film]

The near-infrared reflective film of the present invention is constituted by lamination of units each constituted by a high refractive index layer and a low refractive index layer, and it is specifically preferable to form the lamination by coating alternately a high refractive index layer and a low refractive index layer and drying the laminated layers.

Preferable examples of the coating methods, include: a roll coating method, rod bar coating method, air-knife coating method, spray coating method, curtain coating method, slide bead coating methods using a hopper which are described in U.S. Pat. Nos. 2,761,419 and 2,761,791, and extrusion coat method.

At the time of performing a simultaneous multilayer coating, the viscosity of each of the high refractive index layer coating liquid and a low refractive index layer coating liquid is preferably in a range of 5 to 100 mPa·s in the case of a slide bead coating method, and more preferably in a range of 10 to 50 mPa·s. Further, in the case of a curtain coating method, it is preferably in a range of 5 to 1,200 mPa·s, and more preferably in a range of 25 to 500 mPa·s.

Further, the viscosity a coating liquid at 15° C. is preferably 100 mPa·s or more, more preferably 100 to 30,000 mPa·s, still more preferably 3,000 to 30,000 mPa·s, and most preferably 10,000 to 30,000 mPa·s.

In the coating and drying procedures, each of a high refractive index layer coating liquid and a low refractive index layer coating liquid are heated to 30° C. or more, and coated. After the coating, the temperature of the coated film was cooled once to 1 to 15° C., and then dried at 10° C. more. More preferably, as the drying condition, a wet bulb temperature is 5 to 50° C., and a film surface temperature is in a range of 10 to 50° C. Further, from the viewpoint of uniformity of the formed coated film, it is desirable to conduct a horizontal set method as the cooling method immediately after the coating.

In the present invention, it is desirable that at the time of preparation of the high refractive index layer coating liquid, at least one kind of compounds A selected from the above compound group (a carboxyl group containing compound, a pyridine derivative and hydroxamic acids) and a water soluble polymer are mixed in a water-based solvent, followed by addition and dispersion of a ruffle type titanium oxide with a volume average particle size of 100 nm or less to prepare the high refractive index layer coating liquid, and subsequently, a high refractive index layer is formed by use of the prepared coating liquid.

Further, in the production method of producing the near-infrared reflective film of the present invention, according to one of the preferable production methods, at the time of production of the near-infrared reflective film, a high refractive index layer coating liquid is prepared so as to contain a low molecular weight gelatin or collagen peptide with an average molecular weight of 30,000 or less as the compound A in an amount of 15 weight % or more and 45 weight % or less and a high molecular weight gelatin with an average molecular weight of 100,000 or more as a water soluble polymer in an amount of 15 weight % or more and 40 weight % or less to the total weight of the high refractive index layer together with the rutile type titanium oxide with a volume average particle size of 100 nm or less, and the high refractive index layer is formed the prepared high refractive index layer coating liquid.

The application of the above production method enables the rutile type titanium oxides to reside by being dispersed stably in a water-based medium, and ensures the thickening ability (viscosity increasing ability) as the coating liquid in a low temperature environment. As a result, it becomes possible to obtain a uniform coated film without causing blowing unevenness on the formed coated film at the time of drying of the coated film, and to obtain a near-infrared reflective film excellent in environmental adaptability.

Further, in the production method of producing the near-infrared reflective film of the present invention, according to one of the preferable production methods, at the time of production of the near-infrared reflective film, a high refractive index layer coating liquid is prepared so as to contain a water-based sol which contains a ruffle type titanium dioxide with a volume average particle size of 100 nm or less and has a pH of 1.0 or more and 3.0 or less and a positive zeta potential, amino acids with an isoelectric point of 6.5 or less as the compound A, and a water soluble polymer, and the high refractive index layer is formed the prepared high refractive index layer coating liquid.

[Application of a Near-Infrared Reflective Film]

The near-infrared reflective film of the present invention is applicable to broad fields. For example, for the purpose of mainly enhancing weather resistance, the near-infrared reflective film is used as heat ray reflecting films with an effect to reflect heat rays. Actually, the near-infrared reflective film is used as film to be passed on windows such as outdoor windows of buildings or car windows which are exposed to sunbeams for a long time, and film for agricultural Vinyl greenhouses.

The near-infrared reflective film according to the present invention is especially suitable as a member to be pasted directly or via adhesive onto glass or resin substrate used in place of glass.

In the case of pasting on a window glass, adhesives are disposed such that the near-infrared reflective film is positioned at the sunbeam (heat ray) incident side. Further, the sandwiching of the near-infrared reflective film between the window glass and the substrate enables to seal the near-infrared reflective film from environment gas such as moisture. Accordingly, it is preferable from the point of durability. The disposition of the near-infrared reflective film of the present invention at the outdoor or the outside (for pasting on outside) of vehicles is preferable to enhance the durability for environment.

As adhesives applicable to the present invention, adhesives including light hardenable or heat hardenable resin as main components may be used.

The adhesives are preferable to have durability for ultraviolet light, and acrylic-based adhesive and silicone-based adhesive are desirable. Further, from the viewpoints of adhesion characteristics and cost, acrylic type adhesive are more preferable. Furthermore, specifically from the viewpoints of easy control of peel-off resistance, in comparison between solvent-type or emulsion-type acrylic-based adhesive, the solvent-type is preferable. In the case of use of solution polymerization polymer as acrylic solvent type adhesive, well-known monomer can be used.

Further, as an interlayer of a pasted glass, polyvinyl butyral resin or ethylene-vinylacetate copolymer resin may be used. Specific examples include plasticity polyvinyl butyral (manufactured by Sekisui Chemical Co., Ltd., and Mitsubishi Monsanto Co., etc.), ethylene-vinylacetate copolymer (Duramin, manufactured by E. I. du Pont de Nemours & Co., and Takeda Chemical Industries, Ltd.), modified ethylene-vinylacetate copolymer (Melsen G, manufactured by TOSOH CORP.). Moreover, into the adhesive layer, an ultraviolet absorber, anti-oxidant, antistatic agent, heat stabilizer, lubricant, bulking agent, coloring agent, adhesion regulating agent, and the like are suitably added and blended.

EXAMPLE

Hereafter, although the present invention is described specifically based on examples, the present invention should not be limited to these examples. In the examples, the indication of "parts" or "%" represents "parts by weight" or "% by weight" unless otherwise specified.

Example 1

<<Production of a Near-Infrared Reflective Film>>
[Production of Sample 1]
(High Refractive Index Layer 1)
(Preparation of a High refractive Index Layer Coating Liquid 1)

The high refractive index layer coating liquid 1 was prepared in accordance with an addition method A being the following addition procedure.

Into a solution in which 2.5 parts of tamarind seed gum as thickening polysaccharides, 0.5 parts of polyvinyl alcohol (PVA203, produced by Kuraray Co., Ltd.), and 5.0 parts of L1-17 (aminocarboxylic acids) being an exemplary compound as the compound A according to the present invention were dissolved in 340 parts of water, 5.0 parts of a 5.5 weight % aqueous solution of boric acid with a pH of 3.0 adjusted with nitric acid and 56 parts of a 20 weight % solution of the below-mentioned rutile-type titanium dioxide grain sol were added, whereby the high refractive index layer coating liquid 1 was prepared.

<Preparation of Titanium Oxide Particle Sol>

Into 10 L(liter) of an aqueous suspension solution ($TiO_2$ concentration of 100 g/L) in which a titanium dioxide hydrate was suspended in water, 30 L of a sodium hydroxide aqueous solution (concentration of 10 mol/L) was added under agitation, heated to 90° C., and ripened for 5 hours. Thereafter, the resultant solution was neutralized with hydrochloric acid, filtered and washed. The titanium dioxide hydrate used in the above reaction (treatment) was produced through heat hydrolysis of a titanium sulfate aqueous solution in accordance with the known procedure.

A base-treated titanium compound was suspended in purified water so as to make a $TiO_2$ concentration become 20 g/L, then, into the suspension solution, citric acid was added in an amount of 0.4 mol % to the amount of $TiO_2$ under agitation, and the resultant solution was heated to raise its temperature. Successively, when the temperature became 95° C., a concentrated hydrochloric acid was added into the solution so as to make a hydrochloric acid concentration become 30 g/L, followed by agitation for 3 hours while maintaining the solution temperature, whereby a titanium oxide particle sol containing 20 weight % of titanium oxide particles was prepared.

The obtained titanium oxide sol was subjected to measurement of pH and zeta potential. As a result, pH was 1.4 and zeta potential was +40 mV. Further, a particle size measurement was performed by Zetasizer Nano manufactured by Malvem Instruments Ltd. As a result, a volume average particle size was 35 nm, and a degree of monodispersity was 16%. Further, the titanium oxide sol liquid was dried at 105° C. for 3 hours, thereby obtaining particle powder. The obtained particle powder was subjected to X-ray diffraction measurement by use of an X-ray diffractometer (JDX-3530 type) manufactured by JEOL DATUM Ltd. As a result, it was confirmed that the particle powder was rutile type titanium oxide particles.

(Formation of a High Refractive Index Layer 1)

The high refractive index layer coating liquid 1 prepared in the above was coated, while being kept at 45° C., by use of a wire bar on a 50-nm-thick polyethylene terephthalate film heated to 45° C. on the condition that its dried film thickness was made to be 135 nm. Successively, the coated layer was set by being sprayed with cold air for one minute on the condition that its layer surface was made to be 15° C. or less, and then dried by being sprayed with warm air with a temperature of 80° C., whereby the high refractive index layer 1 was formed.

(Preparation of a Low Refractive Index Layer Coating Liquid 1)

Into 0.6 parts of a 23.5 weight % aqueous solution of poly aluminum chloride (Takibains #1500, manufactured by Taki Chemical Co., Ltd.), 28 parts of a 10 weight % aqueous solution of colloidal silica (Snowtex OS, manufactured by Nissan chemistry company) and 10.0 parts of a 5.5 weight % aqueous solution of boric acid with a pH of 3.0 adjusted with nitric acid were added and dispersed. Subsequently, into this dispersion liquid, 14.5 parts of a 1 weight % solution of tamarind seed gum and 2.0 parts of a 5.0 weight % solution of polyvinyl alcohol (PVA217, manufactured by Kuraray Co., Ltd.) were added, whereby the low refractive index layer coating liquid 1 was prepared.

(Formation of a Low Refractive Index Layer 1)

Next, the low refractive index layer coating liquid 1 was coated, while being kept at 45° C., by use of a wire bar on the high refractive index layer 1 on the polyethylene terephthalate film heated to 45° C. on the condition that its dried film thickness was made to be 175 nm. Successively, the coated layer was set by being sprayed with cold air for one minute on the condition that its layer surface was made to be 15° C. or less, and then dried by being sprayed with warm air with a temperature of 80° C., whereby the low refractive index layer 1 was formed.

(Formation of a Laminated Member)

Similarly, on the low refractive index layer 1, five units each constituted by a high refractive index layer 1 and a low refractive index layer 1 were further laminated, whereby Sample 1 of a near-infrared reflective film constituted by six high refractive index layers and six low refractive index layers (12 layers in total) was produced.

[Production of Samples 2 to 7]

Samples 2 to 7 were produced in the same way as that in Sample 1 except that in the preparation of the high refractive index layer coating liquid 1 used for formation of the high refractive index layer 1 used for production of the above Sample 1, L1-17 being an exemplary compound as the compound A was replaces with the same amount of L1-1 (amino polycarboxylic acids), L1-6 (aliphatic carboxylic acids), L1-3 (aromatic carboxylic acids), L1-22 (pyridine derivative: picolinic acid), L1-23 (pyridine derivative: nicotinic acid), and L1-21 (hydroxamic acid), respectively.

[Production of Samples 8 to 13]

Samples 8 to 13 were produced by use of a high refractive index layer coating liquid prepared in the same way as that in Sample 5 except that in the preparation of the high refractive index layer coating liquid used for formation of the high refractive index layer used for production of the above Sample 5, an addition amount (g/lg of $TiO_2$) of L1-22 (pyridine derivative: picolinic acid) being the compound A was changed to 0.18 g, 0.28 g, 0.30 g, 0.70 g, and 1.1 g, respectively.

[Production of Sample 14]

Sample 14 was produced by use of a high refractive index layer coating liquid prepared in the same way as that in Sample 5 except that in the preparation of the high refractive index layer coating liquid used for formation of the high refractive index layer used for production of the above Sample 5, the high refractive index layer coating liquid was prepared by an addition method B described below in place of the addition method A as a preparation method, a high refractive index layer coating liquid was prepared by the following addition method A and used.

(Preparation of a High Refractive Index Layer Coating Liquid: Addition Method B)

The high refractive index layer coating liquid was prepared in accordance with the addition method B being the following addition procedure.

Into 56 parts of a 20 weight % solution of the above-mentioned rutile type titanium oxide particle sol, 250 parts of a 1 weight % tamarind seed gum aqueous solution as thickening polysaccharides, 10 parts of a 5 weight % polyvinyl alcohol (PVA203, manufactured by Kuraray Co., Ltd.), 33 parts of a 15 weight % L1-22 (pyridine derivative: picolinic acid) aqueous solution, and 5.0 parts of a 5.5 weight % aqueous solution of boric acid with a pH of 3.0 adjusted with nitric acid, were sequentially added and dispersed, whereby a high refractive index layer coating liquid was prepared.

[Production of Sample 15]

Sample 15 was produced by use of a high refractive index layer coating liquid prepared in the same way as that in Sample 5 except that in the preparation of the high refractive index layer coating liquid used for formation of the high refractive index layer used for production of the above Sample 5, further, 1.0 part of a 23.5 weight % aqueous solution of poly aluminum chloride (Takibains #1500, manufactured by Taki Chemical Co., Ltd.) was added as an inorganic polymer.

[Production of Sample 16]

Sample 16 was produced by use of a high refractive index layer coating liquid prepared in the same way as that in Sample 5 except that in the preparation of the high refractive index layer coating liquid used for formation of the high refractive index layer used for production of the above Sample 5, in place of tamarind seed gum being a thickening polysaccharide, the same amount of lime-treated gelatin was used

[Production of Sample 17]

Sample 17 was produced by use of a high refractive index layer coating liquid prepared in the same way as that in Sample 5 except that in the preparation of the high refractive index layer coating liquid used for formation of the high refractive index layer used for production of the above Sample 5, the addition amount of tamarind seed gum was changed to 3.0 parts, and PVA 203 was not added.

[Production of Sample 18]

Sample 18 was produced by use of a high refractive index layer coating liquid prepared in the same way as that in Sample 5 except that in the preparation of the high refractive index layer coating liquid used for formation of the high refractive index layer used for production of the above Sample 5, in place of tamarind seed gum being a thickening polysaccharide, the same amount of polyvinyl alcohol (PVA 235, manufactured by Kuraray Co., Ltd.) was used.

[Production of Sample 19]

Sample 19 was produced by use of a high refractive index layer coating liquid prepared in the same way as that in Sample 5 except that in the preparation of the high refractive index layer coating liquid used for formation of the high refractive index layer used for production of the above Sample 5, in place of titanium oxide particles with a volume average particle size of 35 nm, titanium oxide particles with a volume average particle size of 129 nm was used

[Production of Sample 20]

Sample 20 was produced in accordance with the following method.

(Preparation of a High Refractive Index Layer Coating Liquid 20)

Forty parts of titanium oxide particles (volume average particle size: 15 nm), two parts of dioctyl sulphosaccinate (surface active agent), and 58 parts of toluene were mixed, and then dispersed for 48 hours by use of a ball mill, whereby titanium oxide sol was prepared.

Subsequently, heat hardenable acrylic resin was added in an amount 1.5 times that of the titanium oxide into the titanium oxide sol prepared in the above, whereby the high refractive index layer coating liquid 20 was prepared.

(Formation of a Laminated Member)

On a polyethylene terephthalate film with a thickness of 50 nm, a heat hardenable acrylic resin with a refractive index of 1.47 was coated to form a film thickness of 135 nm, followed by dried and hardened so as to form a low refractive index layer. Thereafter, on this low refractive index layer, the above high refractive index layer coating liquid 20 was coated so as to form a dried film thickness of 175 nm, and hardened with heat at 90° C. for 20 minutes. Similarly, on the high refractive index layer, three units each constituted by a low refractive index layer and a high refractive index layer were further laminated, whereby Sample 20 of a near-infrared reflective film constituted by four high refractive index layers and four low refractive index layers (8 layers in total) was produced.

[Production of Sample 21]
(Substrate)

A polyethylene terephthalate film (Teijin Tetron film, high transparent grade, manufactured by Teijin DuPont) with a thickness of 50 nm was used as a substrate. The surface of the substrate was subjected to corona discharge treatment in order to improve wettability for slurry. Its refractive index was 1.62.

(Formation of a High Refractive Index Layer B)

Materials composed of 100 parts of isopropyl alcohol (special grade chemical, manufactured by Wako Pure Chemical Industries, Ltd.), 3 parts of pyridine (special grade chemical, manufactured by Wako Pure Chemical Industries, Ltd.), 5 parts of an ethyl silicate solution (HAS-1, an active ingredient of 30 weight %, manufactured by Colcoat Co., Ltd.), 10 parts of rutile type titanium dioxide particles (TTO-55, manufactured by Ishihara Sangyo Kaisha, Ltd.) were blended, and then dispersed for 4 hours by use of a ball mill. Subsequently, after confirmation of the fact that a dispersed particle size became 20 nm in D50, 1.5 parts of an ultraviolet curable binder (X-12-2400, an active ingredient of 30 weight %, manufactured by Shin-Etsu Chemical Co., Ltd.) and 0.15 parts of catalyst (DX-2400, manufactured by Shin-Etsu Chemical Co., Ltd.) were blended, and then dispersed for 1 hours by use of a ball mill, followed by confirmation of the fact that a dispersed particle size became 16 nm in D50, whereby the resultant liquid was made to a high refractive index coating liquid B. This coating liquid B was coated on a polyethylene terephthalate film (also called a PET film) with a thickness of 50 μm by use of a bar coater No. 08 so as to form a dried film thickness of 100 nm, followed by dried at 100° C., and then hardened by irradiation of ultraviolet rays (illuminance of 200 to 450 mW/cm$^2$), whereby a high refractive index layer B was formed. The high refractive index layer B had a refractive index of 2.17.

(Formation of a Low Refractive Index Layer B)

Materials composed of 1 part of silica sol with a particle size of 10 to 20 nm (average particle size of 15 nm) ("IPA-ST", manufactured by Nissan Chemical Industries, Ltd.), 10 parts of isopropyl alcohol (special grade chemical, manufactured by Wako Pure Chemical Industries, Ltd.) as a solvent, 5 parts of an ultraviolet curable binder (X-12-2400, manufactured by Shin-Etsu Chemical Co., Ltd.) as a binder, and 0.6 parts of catalyst (DX-2400, manufactured by Shin-Etsu Chemical Co., Ltd.) were blended, and agitated by a stirrer, whereby a low refractive index layer coating liquid B was obtained. The respective primary particle sizes of silica sol (refractive index of 1.45) are almost the same, and a slurry with a dispersed particle size D50 of 45 nm was obtained.

Subsequently, on the high refractive index layer B of the sample in which the high refractive index layer B was formed on the PET film, the low refractive index layer coating liquid B prepared in the above was coated by use of a bar coater No. 08 so as to form a dried film thickness of 100 nm, followed by dried at 100° C., and then hardened by irradiation of ultraviolet rays (illuminance of 200 to 450 mW/cm$^2$), whereby a low refractive index layer B was formed. The formed low refractive index layer B had a refractive index of 1.35.

(Formation of a Laminated Member)

Successively, the high refractive index layer B and the low refractive index layer B were laminated alternately by three layers for each, whereby Sample 21 with eight layers in total was produced.

[Production of Sample 22]
(Substrate)

A polyethylene terephthalate film (Teijin Tetron film, high transparent grade, manufactured by Teijin DuPont) with a thickness of 50 μm was used as a substrate. The surface of the substrate was subjected to corona discharge treatment in order to improve wettability for slurry. Its refractive index was 1.62.

(Formation of a High Refractive Index Layer C)

Spherical rutile type titanium dioxide particles (TTO-51C, manufactured by Ishihara Sangyo Kaisha, Ltd.) with a particle size of 20 nm and methanol as a solvent were mixed and dispersed so as to become a volume ratio of 1:10, whereby a high refractive index layer coating liquid C was prepared.

Successively, this coating liquid C was coated by use of a bar coater on the above substrate so as to form a dried film thickness of 230 nm, followed by dried, whereby a high refractive index layer C was formed. The high refractive index layer C had a refractive index of 2.00.

Spherical colloidal silica sol (Snowtex PS, manufactured by Ishihara Sangyo Kaisha, Ltd.) with a particle size of 10 to 15 nm (average particle size of 12 nm) and methanol as a solvent were mixed and dispersed so as to become a volume ratio of 1:10, whereby a low refractive index layer coating liquid C was prepared.

Subsequently, on the high refractive index layer C formed on the above substrate, the low refractive index layer coating liquid C was coated by use of a bar coater so as to form a dried film thickness of 230 nm, followed by dried, whereby a low refractive index layer C was formed. The low refractive index layer C had a refractive index of 1.25.

(Formation of a Laminated Member)

Successively, by use of the high refractive index layer coating liquid C and the low refractive index layer coating liquid C, on the low refractive index layer C, a high refractive index layer and a low refractive index layer are sequentially laminated under the similar condition, whereby the laminated member constituted by the following seven layers was produced.

A substrate/a high refractive index layer C/a low refractive index layer C/a high refractive index layer C/a low refractive index layer C/a high refractive index layer C/a low refractive index layer C/a high refractive index layer C (Formation of the Uppermost Layer)

Silica sol (methanol silica sol, manufactured by Ishihara Sangyo Kaisha, Ltd.) with a particle size of 10 to 20 nm (average particle size of 15 nm) and methanol as a solvent were mixed and dispersed so as to become a volume ratio of 1:20, whereby a coating liquid for the uppermost layer was prepared.

Subsequently, on the high refractive index layer C of the laminated member in which the seven refractive index layer were formed on the substrate, the coating liquid for the uppermost layer was coated by use of a bar coater so as to form a dried film thickness of 125 nm, followed by dried, whereby the uppermost layer was formed, and Sample 22 was produced. The uppermost layer has a refractive index of 1.35.

[Production of Sample 23]

Sample 23 was produced in the same way as that in Sample 1 except that in the preparation of the high refractive index layer coating liquid 1 for forming the high refractive index layer 1, L1-17 being the compound A was eliminated.

The main constitution and the forming method of the high refractive index layer of the near-infrared reflective films 1 to 21 produced in the above are shown in Table 1.

TABLE 1

Main constitution of a high refractive index layer

| Near-infrared reflective film No. | Titanium oxide Average particle size (nm) | Water-soluble polymer 1 | Water-soluble polymer 2 | Water-soluble polymer 3 | Compound A Kind | *1 (g) | Coating liquid preparing method | Remarks |
|---|---|---|---|---|---|---|---|---|
| 1 | 35 | PVA203 | TG | — | Exemplary compound (LI-17) | 0.45 | Adding method A | Inventive |
| 2 | 35 | PVA203 | TG | — | Exemplary compound (LI-1) | 0.45 | Adding method A | Inventive |
| 3 | 35 | PVA203 | TG | — | Exemplary compound (LI-6) | 0.45 | Adding method A | Inventive |
| 4 | 35 | PVA203 | TG | — | Exemplary compound (LI-3) | 0.45 | Adding method A | Inventive |
| 5 | 35 | PVA203 | TG | — | Exemplary compound (LI-22) | 0.45 | Adding method A | Inventive |
| 6 | 35 | PVA203 | TG | — | Exemplary compound (LI-23) | 0.45 | Adding method A | Inventive |
| 7 | 35 | PVA203 | TG | — | Exemplary compound (LI-21) | 0.45 | Adding method A | Inventive |
| 8 | 35 | PVA203 | TG | — | Exemplary compound (LI-22) | 0.18 | Adding method A | Inventive |
| 9 | 35 | PVA203 | TG | — | Exemplary compound (LI-22) | 0.28 | Adding method A | Inventive |
| 10 | 35 | PVA203 | TG | — | Exemplary compound (LI-22) | 0.30 | Adding method A | Inventive |
| 11 | 35 | PVA203 | TG | — | Exemplary compound (LI-22) | 0.70 | Adding method A | Inventive |
| 12 | 35 | PVA203 | TG | — | Exemplary compound (LI-22) | 0.73 | Adding method A | Inventive |
| 13 | 35 | PVA203 | TG | — | Exemplary compound (LI-22) | 1.10 | Adding method A | Inventive |
| 14 | 35 | PVA203 | TG | — | Exemplary compound (LI-22) | 0.45 | Adding method B | Inventive |
| 15 | 35 | PVA203 | TG | PAC | Exemplary compound (LI-22) | 0.45 | Adding method A | Inventive |
| 16 | 35 | PVA203 | Gel | — | Exemplary compound (LI-22) | 0.45 | Adding method A | Inventive |
| 17 | 35 | — | TG | — | Exemplary compound (LI-22) | 0.45 | Adding method A | Inventive |
| 18 | 35 | PVA203 | PVA235 | — | Exemplary compound (LI-22) | 0.45 | Adding method A | Inventive |
| 19 | 129 | PVA203 | TG | — | Exemplary compound (LI-22) | 0.45 | Adding method A | Comparative |
| 20 | 15 | — | — | — | — | — | — | Comparative |
| 21 | 35 | — | — | — | (Pyridine) | — | — | Comparative |
| 22 | 20 | — | — | — | — | — | — | Comparative |
| 23 | 35 | PVA203 | TG | — | — | — | Adding method A | Comparative |

*1: Added amount (g/gTiO$_2$) to 1 g of titanium oxide

In this connection, the details of the water soluble polymers indicated with the abbreviated names in Table 1 are as follows.

PVA203: Polyvinyl alcohol, PVA203, manufactured by Kuraray Co., Ltd.

PVA235: Polyvinyl alcohol, PVA235, manufactured by Kuraray Co., Ltd.

TG: Tamarind seed gum (thickening polysaccharides)

PAC: Poly aluminum chloride (Takibains #1500, inorganic polymer, manufactured by Taki Chemical Co., Ltd.)

Gel: Lime-treated gelatin

<<Evaluation of a Near-Infrared Reflective Film>>

Measurement of the following characteristics and evaluation of performance were performed for each of the near-infrared reflective films produced in the above. In this connection, in Sample 21, the titanium oxide particles aggregated intensely in the high refractive index layer and the quality of the film surface was too bad to receive evaluation. Accordingly, Sample 21 was removed from the evaluation targets (in Table 2, represented with ND).

(Measurement of the Refractive Index of Each Layer)

A sample was prepared in such a way that a target layer (a high refractive index layer, a low refractive index layer) to be subjected to the measurement of a refractive index is coated to form a single layer on a substrate. Subsequently, the refractive index of each of the high refractive index layers and the low refractive index layers was determined in accordance with the following method.

The reverse surface of each Sample at the measurement side was subjected to surface roughening treatment, and then further to light absorbing treatment with a black spray so that the reverse surface was configured to prevent light from reflecting. The reflectance ratio of each Sample in a visible light region (400 nm to 700 nm) was measured by use of U-4000 type (manufactured by Hitachi, Ltd.) as a spectrophotometer on the condition of 5 degree regular reflection, and then a refractive index was determined from the measurement results of the reflectance ratio for each Sample.

(Measurement of Visible Light Transmissivity and Near-Infrared Light Transmissivity)

The transmissivity of each near-infrared reflective film for light in a range of 300 nm to 2000 nm was measured by use of the above spectrophotometer (U-4000 type employing an integrating sphere, manufactured by Hitachi, Ltd.). The value of the transmissivity at 550 nm was used as a visible light transmissivity, and the value of the transmissivity at 1200 nm was used as a near-infrared light transmissivity.

(Evaluation of Flexibility)

Each of the near-infrared reflective films produced in the above was subjected to a bending test to bend a sample by 30 times by use of a bending tester type 1 (Type: IMC-AOF2, Mandrel diameter: 20 mm, manufactured by Imoto Machinery Co., Ltd.) in accordance with a bending test method in accordance with JIS K5600-5-1.

<Measurement of a Variation Width of the Near-Infrared Light Transmissivity>

Subsequently, the near-infrared reflective film after having been subjected to the 30 time bending test was further subjected to the measurement of the near-infrared light transmissivity at 1200 nm in the same way as the above, and then, a variation width between the values of the near-infrared light transmissivity before and after the bending test (the near-infrared light transmissivity (%) after the bending test—the near-infrared light transmissivity (%) before the bending test) was obtained. The variation width means that the smaller the increasing width of the near-infrared light transmissivity is, the more excellent, the flexibility of the film is <Visual Observation for a Refractive Index Layer>

The surface of the near-infrared reflective film after having been subjected to the 1000 time bending test was further subjected to visual observation, and the flexibility was evaluated in accordance with the following criterion.

AA: neither a folding trace nor a crack was observed on the surface of the near-infrared reflective film A: a folding trace was slightly observed on the surface of the near-infrared reflective film B: A minute crack was slightly observed on the surface of the near-infrared reflective film.

C: Many clear cracks took place on the surface of the near-infrared reflective film.

The measurement results and evaluation results obtained in the above are shown in Table 2.

TABLE 2

| Near-infrared reflective film No. | Reflective index layer constitution | | | Transmissivity (%) | | Flexibility | | Remarks |
|---|---|---|---|---|---|---|---|---|
| | High reflective index layer | | Reflective index difference *2 | Near-infrared light transmissivity | Visible light transmissivity | Near-infrared change ratio (%) | Visual evaluation | |
| | No. | Reflective index | | | | | | |
| 1 | 1 | 1.82 | 0.36 | 12 | 82 | 1.8 | A | Inventive |
| 2 | 2 | 1.83 | 0.37 | 13 | 82 | 1.8 | A | Inventive |
| 3 | 3 | 1.82 | 0.36 | 13 | 81 | 1.8 | A | Inventive |
| 4 | 4 | 1.84 | 0.38 | 14 | 82 | 1.9 | A | Inventive |
| 5 | 5 | 1.94 | 0.48 | 5 | 89 | 0.0 | AA | Inventive |
| 6 | 6 | 1.80 | 0.34 | 18 | 78 | 2.4 | B | Inventive |
| 7 | 7 | 1.83 | 0.37 | 15 | 80 | 2.0 | A | Inventive |
| 8 | 9 | 1.86 | 0.40 | 11 | 82 | 1.5 | A | Inventive |
| 9 | 10 | 1.90 | 0.44 | 9 | 83 | 1.0 | AA | Inventive |
| 10 | 11 | 1.94 | 0.48 | 7 | 87 | 0.5 | AA | Inventive |
| 11 | 12 | 1.94 | 0.48 | 7 | 90 | 0.7 | AA | Inventive |
| 12 | 13 | 1.91 | 0.45 | 9 | 81 | 1.0 | AA | Inventive |
| 13 | 14 | 1.85 | 0.39 | 11 | 80 | 1.5 | A | Inventive |
| 14 | 15 | 1.90 | 0.44 | 9 | 81 | 1.2 | A | Inventive |
| 15 | 16 | 1.93 | 0.47 | 5 | 90 | 0.3 | AA | Inventive |
| 16 | 17 | 1.93 | 0.47 | 7 | 85 | 0.7 | AA | Inventive |
| 17 | 8 | 1.95 | 0.49 | 5 | 89 | 0.2 | AA | Inventive |
| 18 | 18 | 1.85 | 0.39 | 11 | 82 | 1.8 | A | Inventive |
| 19 | 19 | 1.75 | 0.29 | 25 | 65 | 2.8 | B | Comparative |
| 20 | 20 | 2.10 | 0.63 | 72 | 87 | 4.8 | C | Comparative |
| 21 | 21 | 2.17 | 0.82 | 18 | 84 | 5.5 | C | Comparative |
| 22 | 22 | 2.00 | 0.75 | 3 | 82 | 12.0 | C | Comparative |
| 23 | 23 | ND | ND | ND | ND | ND | ND | Comparative |

*2: (reflective index in a high reflective index layer)-(reflective index in a low reflective index layer)
ND: Measurement was impossible As being clear from Table 2, it turns out that the near-infrared reflective film of the present invention enables to reduce a near-infrared light transmissivity, without reducing visible light transmissivity, and is excellent in flexibility.

Example 2

[Production of a Near-Infrared Reflector]

Near-infrared reflectors 1 to 18 were produced using the respective near-infrared reflective films of Samples 1 to 18 produced in the Example 1. That is, the near-infrared reflectors 1 to 18 were produced in such a way that the respective near-infrared reflective films of Samples 1 to 18 were pasted on respective transparent acrylic resin plates with a thickness of 5 mm and a size of 20 cm×20 cm with an acrylic adhesive

[Evaluation]

Although each of the near-infrared reflectors 1 to 18 has a large-sized near-infrared reflector, they can be utilized easily. Further, the utilization of the near-infrared reflector according to the present invention enables to confirm the excellent near-infrared reflectivity.

Example 3

<<Production of a Near-Infrared Reflective Film>>
[Production of Sample 101]
(Preparation of a High Refractive Index Layer Coating Liquid 101)

The following additives 1) to 6) were added in this order, and mixed, whereby the high refractive index layer coating liquid 101 was prepared.

First, 1) titanium oxide particle sol was heated so as to raise the temperature up to 50° C. while being agitated, 2) low molecule gelatin was added and agitated for 30 minutes, so that the surface of each of titanium oxide particles was covered with the low molecule gelatin. Subsequently, 3) high molecule gelatin, 4) glycine, and 5) purified water were added and agitated for 90 minutes, and then 6) surface active agents were added, whereby the high refractive index layer coating liquid 101 was prepared.

| | |
|---|---|
| 1) 20 weight % titanium oxide particle sol (volume average particle size of 35 nm, rutile type titanium dioxide particles) | 60 g |
| 2) 5.0 weight % low molecular weight gelatin ($Gel_{L1}$) aqueous solution | 125 g |
| 3) 5.0 weight % high molecular weight gelatin ($Gel_{H1}$) aqueous solution | 100 g |
| 4) Glycine (amino acid, Isoelectric point: 5.97) | 1 g |
| 5) Purified water | 150 g |
| 6) 5.0 weight % surface active agent aqueous solution (Coatamin 24P, a quarternary ammonium salt based cation surface active agent, manufactured by Kao Corp.) | 0.45 g |

$Gel_{L1}$ was a low molecular weight gelatin which was hydrolyzed by alkali treatment and had an average molecular weight of 20,000, and Gel$_{H1}$ was an acid-treated gelatin (high molecular weight gelatin) with an average molecular weight of 130,000.

(Preparation of a Low Refractive Index Layer Coating Liquid 101)

The following additives 1) to 5) were added in this order, and mixed, whereby a low refractive index layer coating liquid 101 was prepared.

First, in accordance with preparation patter A, 1) colloidal silica was heated so as to raise the temperature up to 40° C. while being agitated, and, 2) low molecule gelatin was added and agitated for 10 minutes. Subsequently, 3) high molecule gelatin and 4) purified water were added, and agitated for 10 minutes, and thereafter, 5) surface active agents were added, whereby the low refractive index layer coating liquid 101 was prepared.

| | |
|---|---|
| 1) 20 weight % colloidal silica | 68 g |
| 2) 5.0 weight % low molecular weight gelatin (Gel$_{L1}$) aqueous solution | 180 g |
| 3) 5.0 weight % high molecular weight gelatin (Gel$_{H1}$) aqueous solution | 100 g |
| 4) Purified water | 240 g |
| 5) 5.0 weight % surface active agent aqueous solution (Coatamin 24P, a quarternary ammonium salt based cation surface active agent, manufactured by Kao Corp.) | 0.64 g |

Gel$_{L1}$ was a low molecular weight gelatin which was hydrolyzed by alkali treatment and had an average molecular weight of 20,000, and Gel$_{H1}$ was an acid-treated gelatin (high molecular weight gelatin) with an average molecular weight of 130,000.

(Formation of a Laminated Member)
<Formation of a High Refractive Index Layer 101>

The high refractive index layer coating liquid 101 prepared in the above was coated, while being kept at 45° C., by use of a wire bar on a polyethylene terephthalate film which had a thickness of 50 μm and was heated to 45° C., on the condition that a dried film thickness was made to 135 nm. Successively, the coated layer was set by being sprayed with cold air for one minute on the condition that its layer surface was made to be 15° C. or less, and then dried by being sprayed with warm air with a temperature of 80° C., whereby the high refractive index layer 101 was formed.
<Formation of a Low Refractive Index Layer 101>

Next, the low refractive index layer coating liquid 101 was coated, while being kept at 45° C., by use of a wire bar on the high refractive index layer 101 on the polyethylene terephthalate film heated to 45° C. on the condition that its dried film thickness was made to be 175 nm. Successively, the coated layer was set by being sprayed with cold air for one minute on the condition that its layer surface was made to be 15° C. or less, and then dried by being sprayed with warm air with a temperature of 80° C., whereby the low refractive index layer 101 was formed.
<Production of a Near-Infrared reflective Film>

Similarly, on the low refractive index layer 101, five units each constituted by a high refractive index layer 101 and a low refractive index layer 101 were further laminated, whereby Sample 101 of a near-infrared reflective film constituted by six high refractive index layers and six low refractive index layers (12 layers in total) was produced.
[Production of Sample 102]

Sample 102 was produce in the same way with that for Sample 101 except that the following high refractive index layer coating liquid 102 was used in place of the high refractive index layer coating liquid 101.

(Preparation of the High Refractive Index Layer Coating Liquid 102)

The high refractive index layer coating liquid 102 was prepared in the same way as that for the high refractive index layer coating liquid 101 except that in place of 4) Glycine (amino acid, Isoelectric point: 5.97), 4) the same amount of serine (amino acid, Isoelectric point: 5.68) was used.
[Production of Sample 103]

Sample 103 was produce in the same way with that for Sample 101 except that the following high refractive index layer coating liquid 103 and low refractive index layer coating liquid 103 were used in place of the high refractive index layer coating liquid 101 and the low refractive index layer coating liquid 101.

(Preparation of the High Refractive Index Layer Coating Liquid 103)

The high refractive index layer coating liquid 103 was prepared in the same way as that for the high refractive index layer coating liquid 101 except that 1.2 g of hydroxyethyl cellulose (HEC) was added.

(Preparation of the Low Refractive Index Layer Coating Liquid 103)

The low refractive index layer coating liquid 103 was prepared in the same way as that for the low refractive index layer coating liquid 101 except that 1.55 g of hydroxyethyl cellulose (HEC) was added.
[Production of Sample 104]

Sample 104 was produce in the same way with that for Sample 102 except that the following high refractive index layer coating liquid 104 and low refractive index layer coating liquid 104 were used in place of the high refractive index layer coating liquid 102 and the low refractive index layer coating liquid 102.

(Preparation of the High Refractive Index Layer Coating Liquid 104)

The high refractive index layer coating liquid 104 was prepared with the addition patter B in the same way as that for the high refractive index layer coating liquid 102 except that 1.2 g of hydroxyethyl cellulose was added.

(Preparation of the Low Refractive Index Layer Coating Liquid 104)

The low refractive index layer coating liquid 104 was prepared with the addition patter B in the same way as that for the low refractive index layer coating liquid 102 except that 1.55 g of hydroxyethyl cellulose was added.
[Production of Sample 105]

Sample 105 was produce in the same way with that for Sample 103 except that the following high refractive index layer coating liquid 105 were used in place of the high refractive index layer coating liquid 103.

(Preparation of the High Refractive Index Layer Coating Liquid 105)

The high refractive index layer coating liquid 105 was prepared with the addition patter A in the same way as that for the high refractive index layer coating liquid 103 except that in place of the acid-treated gelatin (high molecular weight gelatin Gel$_{H1}$) with an average molecular weight of 130,000, an acid-treated gelatin (high molecular weight gelatin Gel$_{H2}$) with an average molecular weight of 180,000 was used.
[Production of Sample 106]

Sample 106 was produce in the same way with that for Sample 103 except that the following high refractive index layer coating liquid 106 were used in place of the high refractive index layer coating liquid 103.

(Preparation of the High Refractive Index Layer Coating Liquid 106)

The high refractive index layer coating liquid 106 was prepared in the same way as that for the high refractive index layer coating liquid 103 except that in place of hydroxyethyl cellulose (HEC), the same amount of Locust bean gum (polysaccharides 1) was used.

[Production of Sample 107]

Sample 107 was produce in the same way with that for Sample 104 except that the following high refractive index layer coating liquid 107 were used in place of the high refractive index layer coating liquid 104.

(Preparation of the High Refractive Index Layer Coating Liquid 107)

The high refractive index layer coating liquid 107 was prepared in the same way as that for the high refractive index layer coating liquid 104 except that in place of hydroxyethyl cellulose (HEC), the same amount of Locust bean gum (polysaccharides 1) was used.

[Production of Sample 108]

Sample 108 was produce in the same way with that for Sample 106 except that the following high refractive index layer coating liquid 108 were used in place of the high refractive index layer coating liquid 106.

(Preparation of the High refractive Index Layer Coating Liquid 108)

The high refractive index layer coating liquid 108 was prepared in the same way as that for the high refractive index layer coating liquid 106 except that in place of the acid-treated gelatin (high molecular weight gelatin $Gel_{H1}$) with an average molecular weight of 130,000, an acid-treated gelatin (high molecular weight gelatin $Gel_{H2}$) with an average molecular weight of 180,000 was used.

[Production of Sample 109]

Sample 109 was produce in the same way with that for Sample 106 except that the following high refractive index layer coating liquid 109 were used in place of the high refractive index layer coating liquid 106.

(Preparation of the High Refractive Index Layer Coating Liquid 109)

The high refractive index layer coating liquid 109 was prepared in the same way as that for the high refractive index layer coating liquid 106 except that in place of Locust bean gum (polysaccharides 1), the same amount of polyvinyl alcohol (PVA248, manufactured by Kuraray Co., Ltd.) was used.

[Production of Sample 110]

Sample 110 was produce in the same way with that for Sample 107 except that the following high refractive index layer coating liquid 110 were used in place of the high refractive index layer coating liquid 107.

(Preparation of the High Refractive Index Layer Coating Liquid 110)

The high refractive index layer coating liquid 110 was prepared in the same way as that for the high refractive index layer coating liquid 107 except that in place of Locust bean gum, the same amount of polyvinyl alcohol (PVA248, manufactured by Kuraray Co., Ltd.) was used.

[Production of Sample 111]

Sample 111 was produce in the same way with that for Sample 110 except that the following high refractive index layer coating liquid 111 were used in place of the high refractive index layer coating liquid 110.

(Preparation of the High Refractive Index Layer Coating Liquid 111)

The high refractive index layer coating liquid 111 was prepared in the same way as that for the high refractive index layer coating liquid 110 except that in place of the acid-treated gelatin (high molecular weight gelatin $Gel_{H1}$) with an average molecular weight of 130,000, an acid-treated gelatin (high molecular weight gelatin $Gel_{H2}$) with an average molecular weight of 180,000 was used.

TABLE 3

| | | | High reflective index layer | | | | | | | | Low reflective index layer | | | | |
|---|---|---|---|---|---|---|---|---|---|---|---|---|---|---|---|
| | | | | Gelatin | | | | | | | | Gelatin | | | |
| Sample | | | Metal | Low molecular weight | | High molecular weight | | Amino | Water-soluble | | | Metal | Low molecular weight | | High molecular weight | | Water-soluble |
| No. | *2 | *3 | oxide | No. | *1 | No. | *1 | acid | polymer | *2 | *3 | oxide | No. | *1 | No. | *1 | polymer |
| 101 | 101 | 1.88 | $TiO_2$ | $Gel_{L1}$ | 20,000 | $Gel_{H1}$ | 130,000 | Glycine | — | 1 | 1.49 | $SiO_2$ | $Gel_{L1}$ | 20,000 | $Gel_{H1}$ | 130,000 | |
| 102 | 102 | 1.88 | $TiO_2$ | $Gel_{L1}$ | 20,000 | $Gel_{H1}$ | 130,000 | Serine | — | 2 | 1.49 | $SiO_2$ | $Gel_{L1}$ | 20,000 | $Gel_{H1}$ | 130,000 | — |
| 103 | 103 | 1.89 | $TiO_2$ | $Gel_{L1}$ | 20,000 | $Gel_{H1}$ | 130,000 | Glycine | HEC | 3 | 1.49 | $SiO_2$ | $Gel_{L1}$ | 20,000 | $Gel_{H1}$ | 130,000 | HEC |
| 104 | 104 | 1.89 | $TiO_2$ | $Gel_{L1}$ | 20,000 | $Gel_{H1}$ | 130,000 | Serine | HEC | 4 | 1.49 | $SiO_2$ | $Gel_{L1}$ | 20,000 | $Gel_{H1}$ | 130,000 | HEC |
| 105 | 105 | 1.89 | $TiO_2$ | $Gel_{L1}$ | 20,000 | $Gel_{H2}$ | 180,000 | Glycine | HEC | 3 | 1.49 | $SiO_2$ | $Gel_{L1}$ | 20,000 | $Gel_{H1}$ | 130,000 | HEC |
| 106 | 106 | 1.89 | $TiO_2$ | $Gel_{L1}$ | 20,000 | $Gel_{H1}$ | 130,000 | Glycme | Polysaccharides 1 | 3 | 1.49 | $SiO_2$ | $Gel_{L1}$ | 20,000 | $Gel_{H1}$ | 130,000 | HEC |
| 107 | 107 | 1.89 | $TiO_2$ | $Gel_{L1}$ | 20,000 | $Gel_{H1}$ | 130,000 | Serine | Polysaccharides 1 | 4 | 1.49 | $SiO_2$ | $Gel_{L1}$ | 20,000 | $Gel_{H1}$ | 130,000 | HEC |
| 108 | 108 | 1.89 | $TiO_2$ | $Gel_{L1}$ | 20,000 | $Gel_{H2}$ | 180,000 | Glycine | Polysaccharides 1 | 3 | 1.49 | $SiO_2$ | $Gel_{L1}$ | 20,000 | $Gel_{H1}$ | 130,000 | HEC |
| 109 | 109 | 1.89 | $TiO_2$ | $Gel_{L1}$ | 20,000 | $Gel_{H1}$ | 130,000 | Glycine | PVA | 3 | 1.49 | $SiO_2$ | $Gel_{L1}$ | 20,000 | $Gel_{H1}$ | 130,000 | HEC |
| 110 | 110 | 1.89 | TiO2 | $Gel_{L1}$ | 20,000 | $Gel_{H1}$ | 130,000 | Serine | PVA | 4 | 1.49 | $SiO_2$ | $Gel_{L1}$ | 20,000 | $Gel_{H1}$ | 130,000 | HEC |
| 111 | 111 | 1.89 | $TiO_2$ | $Gel_{L1}$ | 20,000 | $Gel_{H2}$ | 180,000 | Glycine | PVA | 3 | 1.49 | $SiO_2$ | $Gel_{L1}$ | 20,000 | $Gel_{H1}$ | 130,000 | HEC |

*1: Average molecular weight,
*2: Coating liquid No.,
*3: Reflective index

In this connection, the details of the water soluble polymers indicated with the abbreviated names in Table 3 are as follows.

HEC: Hydroxyethyl cellulose
Polysaccharide 1: Locust bean gum
Polysaccharide 2: Tamarind seed gum
PVA: Polyvinyl alcohol 245 (manufactured by Kuraray Co., Ltd.)

<<Evaluation of a Near-Infrared Reflective Film>>

Measurement of the following characteristics and evaluation of performance were performed for each of the near-infrared reflective films produced in the above.

(Measurement of the Refractive Index of Each Layer)

A sample was prepared in such a way that a target layer (a high refractive index layer, a low refractive index layer) to be subjected to the measurement of a refractive index is coated to form a single layer on a substrate. Subsequently, the refractive index of each of the high refractive index layers and the low refractive index layers was determined in accordance with the following method.

The reverse surface of each Sample at the measurement side was subjected to surface roughening treatment, and then further to light absorbing treatment with a black spray so that the reverse surface was configured to prevent light from reflecting. The reflectance ratio of each Sample in a visible light region (400 nm to 700 nm) on the condition of 5 degree regular reflection was measured by use of U-4000 type (manufactured by Hitachi, Ltd.) as a spectrophotometer, and then a refractive index was determined from the measurement results of the reflectance ratio for each Sample. (Measurement of visible light transmissivity and near-infrared light transmissivity)

The transmissivity of each near-infrared reflective film for light in a range of 300 nm to 2000 nm was measured by use of the above spectrophotometer (U-4000 type employing an integrating sphere, manufactured by Hitachi, Ltd.). The value of the transmissivity at 550 nm was used as a visible light transmissivity, and the value of the transmissivity at 1200 nm was used as a near-infrared light transmissivity.

(Evaluation of Flexibility)

Each of the near-infrared reflective films produced in the above was subjected to a bending test to bend a sample by 1000 times by use of a bending tester type 1 (Type: IMC-AOF2, Mandrel diameter: 20 mm, manufactured by Imoto Machinery Co., Ltd.) in accordance with a bending test method in accordance with JIS K5600-5-1, and thereafter, the surface of the near-infrared reflective film was subjected to visual observation, and the flexibility was evaluated in accordance with the following criterion.

AA: neither a folding trace nor a crack was observed on the surface of the near-infrared reflective film A: a folding trace was slightly observed on the surface of the near-infrared reflective film B: A minute crack was slightly observed on the surface of the near-infrared reflective film.

C: Many clear cracks took place on the surface of the near-infrared reflective film.

The measurement results and evaluation results obtained in the above are shown in Table 4.

TABLE 4

| Sample No. | Near-infrared light transmissivity (%) | Visible light transmissivity (%) | Flexibility |
| --- | --- | --- | --- |
| 101 | 16 | 86 | A |
| 102 | 19 | 85 | A |
| 103 | 10 | 91 | AA |
| 104 | 12 | 89 | A |
| 105 | 11 | 90 | AA |
| 106 | 11 | 90 | AA |
| 107 | 13 | 88 | A |
| 108 | 11 | 90 | AA |
| 109 | 12 | 90 | AA |
| 110 | 13 | 89 | A |
| 111 | 12 | 90 | AA |

As being clear from Table 4, it turns out that the near-infrared reflective film of the present invention enables to reduce a near-infrared light transmissivity, without reducing visible light transmissivity, and is excellent in flexibility.

Example 4

[Production of Near-Infrared Reflectors 101 to 111]

Near-infrared reflectors 101 to 113 were produced using the respective near-infrared reflective films of Samples 101 to 111 produced in the Example 3. That is, the near-infrared reflectors 101 to 111 were produced in such a way that the respective near-infrared reflective films of Samples 101 to 111 were pasted on respective transparent acrylic resin plates with a thickness of 5 mm and a size of 20 cm×20 cm with an acrylic adhesive.

[Evaluation]

Although each of the near-infrared reflectors 101 to 111 has a large-sized near-infrared reflector, they can be utilized easily. Further, the utilization of the near-infrared reflector according to the present invention enables to confirm the excellent near-infrared reflectivity.

Example 5

<<Preparation of Titanium Oxide Particle Sol>>

[Preparation of Titanium Oxide Particle sol 1]

Into 10 L of an aqueous suspension solution ($TiO_2$ concentration: 100 g/L) in which a titanium dioxide hydrate was suspended in water, 30 L of a sodium hydroxide aqueous solution (concentration: 10 mol/L) was added while being agitated, heated to raise its temperature to 90° C., and ripened for 5 hours. Thereafter, the resultant solution was neutralized with hydrochloric acid, filtered and washed. The titanium dioxide hydrate used in the above reaction was produced through heat hydrolysis of a titanium sulfate aqueous solution in accordance with the known procedure.

A base-treated titanium compound was suspended in purified water so as to make a $TiO_2$ concentration become 20 g/L, then, into the suspension solution, citric acid was added in an amount of 0.4 mol % to the amount of $TiO_2$ under agitation, and the resultant solution was heated to raise its temperature. Successively, when the temperature became 95° C., a concentrated hydrochloric acid was added into the solution so as to make a hydrochloric acid concentration become 30 g/L, followed by agitation for 3 hours while maintaining the solution temperature.

Subsequently, ph and zeta potential of the obtained titanium oxide sol liquid were measured. As a result, the ph was 1.4 and the zeta potential was +40 mV. Further, particle size was measured by Zetasizer Nano manufactured by Malvern Instruments Ltd. As a result, average particle size was 35 nm and the degree of monodispersity was 16%. Further, the titanium oxide sol liquid was dried at 105° C. for 3 hours, thereby obtaining particle powder. The obtained particle powder was subjected to X-ray diffraction measurement by use of an X-ray diffractometer (JDX-3530 type) manufactured by JEOL DATUM Ltd. As a result, it was confirmed that the particle powder was rutile type titanium oxide particles.

[Preparation of Titanium Oxide Particle Sol 2]

The titanium oxide particle sol 2 was produced in the same way as that in the titanium oxide particle sol 1 except that in place of the concentrated hydrochloric acid, 1 mol/L of nitric acid was added so as to make a nitric acid concentration become 30 g/L. The obtained titanium oxide sol 2 was subjected to measurement of ph, Zeta potential, particle size, the degree of monodispersity, and crystal type in the same way.

The characteristics of each titanium oxide particle sol are shown in Table 5.

TABLE 5

| No. | Crystal type | Average particle size nm | Degree of monodispersity % | pH | Zeta potential mV |
|---|---|---|---|---|---|
| Titanium oxide particle sol 1 | rutile | 18 | 16 | 1.4 | +40 |
| Titanium oxide particle sol 2 | rutile | 35 | 22 | 3.0 | +30 |

[Production of Sample 201]
(Preparation of Each Refractive Index Layer Coating Liquid)
<Preparation of a High Refractive Index Layer coating Liquid 201>

Into 50 parts of water, 4.0 parts of polyvinyl alcohol (PVA235, manufactured by Kuraray Co., Ltd.) was dissolved, followed by addition of 5.0 parts of a 1.0 weight % aqueous solution of boric acid with a pH of 3.0 adjusted with nitric acid and 100 parts of titanium oxide particle sol, and further followed by finishing with 250 parts of purified water, whereby a high refractive index layer coating liquid 201 was prepared. In this high refractive index layer coating liquid 201, in addition, white turbidity occurred, and aggregated particles were observed in the film after coating.

<Preparation of a Low refractive Index Layer Coating Liquid 2A>

Into 50 parts of water, 4.0 parts of polyvinyl alcohol (PVA235, manufactured by Kuraray Co., Ltd.) was dissolved, followed by addition of 5.0 parts of a 1.0 weight % aqueous solution of boric acid with a pH of 3.0 adjusted with nitric acid and 100 parts of silica sol (Silicadol 20P, manufactured by Nippon Chemical Industrial Co., Ltd.), and further followed by finishing into 250 parts with purified water, whereby a low refractive index layer coating liquid 2A was prepared.

(Formation of a laminated member)
(Formation of a High Refractive Index Layer 201)

The high refractive index layer coating liquid 201 prepared in the above was coated, while being kept at 45° C., by use of a wire bar on a polyethylene terephthalate film which had a thickness of 50 μm and was heated to 45° C., on the condition that a dried film thickness was made to 135 nm. Successively, the coated layer was set by being sprayed with cold air for one minute on the condition that its layer surface was made to be 15° C. or less, and then dried by being sprayed with warm air with a temperature of 80° C., whereby the high refractive index layer 201 was formed.

(Formation of a Low Refractive Index Layer 2A)

Next, the low refractive index layer coating liquid 2A was coated, while being kept at 45° C., by use of a wire bar on the high refractive index layer 201 on the polyethylene terephthalate film heated to 45° C. on the condition that its dried film thickness was made to be 175 nm. Successively, the coated layer was set by being sprayed with cold air for one minute on the condition that its layer surface was made to be 15° C. or less, and then dried by being sprayed with warm air with a temperature of 80° C., whereby the low refractive index layer 2A was formed.

Further, on the low refractive index layer 2A, a high refractive index layer 201/a low refractive index layer 2A/high refractive index layer 201/a low refractive index layer 2A/a high refractive index layer 201/a low refractive index layer 2A/a high refractive index layer 201/a low refractive index layer 2A were laminated, whereby Sample 201 being a near-infrared reflective film composed of ten layers in total was produced.

At the time of formation of each layer, each layer was coated as a single layer and dried in such a way that, after a preceding layer has been dried, a succeeding layer was laminated.

[Production of Sample 202]

Sample 202 composed of 10 layers was produced in the same way as that for Sample 201 except that the high refractive index layer 202 was formed by use of the high refractive index layer coating liquid 202 in place of the high refractive index layer coating liquid 201 used for formation of the high refractive index layer 201.

(Preparation of the High Refractive Index Layer Coating Liquid 202)

Into 100 parts of the titanium oxide particle sol 2, 1.0 part of serine as an amino acid was added, followed by addition of 250 parts of purified water, whereby the high refractive index layer coating liquid 202 was prepared.

(Formation of a High Refractive Index Layer 202)

The high refractive index layer coating liquid 202 prepared in the above was coated, while being kept at 45° C., by use of a wire bar on a polyethylene terephthalate film which had a thickness of 50 μm and was heated to 45° C., on the condition that a dried film thickness was made to 115 nm. Successively, the coated layer was set by being sprayed with cold air for one minute on the condition that its layer surface was made to be 15° C. or less, and then dried by being sprayed with warm air with a temperature of 80° C., whereby the high refractive index layer 202 was formed.

(Formation of a Low Refractive Index Layer 2A)

Next, the low refractive index layer coating liquid 2A used for production of Sample 201 was coated, while being kept at 45° C., by use of a wire bar on the high refractive index layer 202 on the polyethylene terephthalate film heated to 45° C. on the condition that its dried film thickness was made to be 175 nm Successively, the coated layer was set by being sprayed with cold air for one minute on the condition that its layer surface was made to be 15° C. or less, and then dried by being sprayed with warm air with a temperature of 80° C., whereby the low refractive index layer 2A was formed.

[Production of Sample 203]

Sample 203 composed of 10 layers was produced in the same way as that for Sample 201 except that the high refractive index layer 203 was formed by use of the following high refractive index layer coating liquid 203 in place of the high refractive index layer coating liquid 201 used for formation of the high refractive index layer 201.

(Preparation of the High Refractive Index Layer Coating Liquid 203)

A first liquid was prepared such that 5 parts of a mixture solution in which a 1.0 weight % aqueous solution of boric acid with a pH of 3.0 adjusted with nitric acid and a 4.0 weight % aqueous solution of borax were mixed with a ratio of 1:1 was added into a polyvinyl alcohol solution in which 4.0 parts of polyvinyl alcohol (PVA235, manufactured by Kuraray Co., Ltd.) was dissolved in 25 parts of water. A second liquid was prepared by adding 1.0 part of serine as an amino acid into 100 parts of titanium oxide particle sol 1. The firs liquid and the second liquid were mixed, followed by finishing with 250 parts of purified water, whereby the high refractive index layer coating liquid 203 was prepared.

[Production of Sample 204]

Sample 204 composed of 10 layers was produced in the same way as that for Sample 203 except that the high refractive index layer 204 was formed by use of the following high refractive index layer coating liquid 204 in place of the high refractive index layer coating liquid 203 used for formation of the high refractive index layer 203.

(Preparation of the High Refractive Index Layer Coating Liquid 204)

The high refractive index layer coating liquid 204 was prepared in the same way as that in the high refractive index layer coating liquid 203 except that in place of polyvinyl alcohol (PVA235, manufactured by Kuraray Co., Ltd.), water soluble inorganic polymer (HAS-1, manufactured by Colcoat Co., Ltd.) was used.

[Production of Sample 205]

Sample 205 composed of 10 layers was produced in the same way as that for Sample 203 except that the high refractive index layer 205 was formed by use of the following high refractive index layer coating liquid 205 in place of the high refractive index layer coating liquid 203 used for formation of the high refractive index layer 203.

(Preparation of the High Refractive Index Layer Coating Liquid 205)

The high refractive index layer coating liquid 205 was prepared in the same way as that in the high refractive index layer coating liquid 203 except that in place of polyvinyl alcohol (PVA235, manufactured by Kuraray Co., Ltd.), water soluble inorganic polymer (zircozol ZC-2, manufactured by DAICHIKIGENSO KAGAKU KOGYOU Co., Ltd.) was used.

[Production of Sample 206]

Sample 206 composed of 10 layers was produced in the same way as that for Sample 203 except that the high refractive index layer 206 was formed by use of the following high refractive index layer coating liquid 206 in place of the high refractive index layer coating liquid 203 used for formation of the high refractive index layer 203.

(Preparation of the High Refractive Index Layer Coating Liquid 206)

The high refractive index layer coating liquid 206 was prepared in the same way as that in the high refractive index layer coating liquid 203 except that in place of polyvinyl alcohol (PVA235, manufactured by Kuraray Co., Ltd.), water soluble inorganic polymer (Takibain #1500, manufactured by Taki Chemical Co., Ltd.) was used.

[Production of Sample 207]

Sample 207 composed of 10 layers was produced in the same way as that for Sample 203 except that the high refractive index layer 207 was formed by use of the following high refractive index layer coating liquid 207 in place of the high refractive index layer coating liquid 203 used for formation of the high refractive index layer 203.

(Preparation of the High Refractive Index Layer Coating Liquid 207)

The high refractive index layer coating liquid 207 was prepared in the same way as that in the high refractive index layer coating liquid 203 except that in place of polyvinyl alcohol (PVA235, manufactured by Kuraray Co., Ltd.), tamarind seed gum which was water-soluble thickening polysaccharides was used.

[Production of Samples 208 to 210: the Present Invention]

Samples 208 to 210 were produced in the same way as that in Sample 207 except that the following high refractive index layer coating liquids 208 to 210 were used respectively in place of the high refractive index layer coating liquid 207 used for formation of the high refractive index layer 207.

(Preparation of the High Refractive Index Layer Coating Liquids 208 to 210)

The high refractive index layer coating liquids 208 to 210 were prepared in the same way as that in the high refractive index layer coating liquid 207 except that as an amino acid, L-cysteine, glycine, and proline were used respectively in place of serine.

[Production of Sample 211]

Sample 211 was produced in the same way as that in Sample 203 except that the following high refractive index layer coating liquid 211 was used in place of the high refractive index layer coating liquid 203 used for formation of the high refractive index layer 203.

(Preparation of the High Refractive Index Layer Coating Liquid 211)

The high refractive index layer coating liquid 211 was prepared in the same way as that in the high refractive index layer coating liquid 203 except that in place of polyvinyl alcohol (PVA235, manufactured by Kuraray Co., Ltd.), 1.0 part of water soluble inorganic polymer (Takibains #1500, manufactured by Taki Chemical Co., Ltd.) and tamarind seed gum being water-soluble thickening polysaccharides were used by being dissolved.

[Production of Sample 212]

Sample 212 was produced in the same way as that in Sample 203 except that the following high refractive index layer coating liquid 212 was used in place of the high refractive index layer coating liquid 203 used for formation of the high refractive index layer 203, the following low refractive index layer coating liquid 2B was used in place of the low refractive index layer coating liquid 2A used for formation of the low refractive index layer 2A, and Sample 212 was produced by a method of coating 10 layer simultaneously.

(Preparation of the High Refractive Index Layer Coating Liquid 212)

The high refractive index layer coating liquid 212 was prepared in such a way that into a solution in which 4.0 parts of a water-soluble inorganic polymer (Takibain #1500, manufactured by Taki Chemical Co., Ltd.) was dissolved in 25 parts of water, a liquid in which 1.0 parts of serine as an amino acid was added into 100 parts of a titanium oxide particle sol 2, was mixed, followed by finishing into 250 parts with purified water.

(Preparation of the Low Refractive Index Layer Coating Liquid 2B)

Four parts of tamarind seed gums being water soluble thickening polysaccharides was dissolved into 50 parts of water, followed by addition of 100 parts of silica sol (Silicadol 20P, manufactured by Nippon Chemical Industrial Co., Ltd.), and further followed by finishing into 250 parts with purified water, whereby the low refractive index layer coating liquid 2B was prepared.

[Production of Sample 213]

Sample 213 was produced by the method of coating 10 layer simultaneously in the same way as that in Sample 212 except that the following high refractive index layer coating liquid 213 was used in place of the high refractive index layer coating liquid 212 used for formation of the high refractive index layer 212.

(Preparation of the High Refractive Index Layer Coating Liquid 213)

The high refractive index layer coating liquid 213 was prepared in the same way as that in the high refractive index layer coating liquid 212 except that in place of the water-soluble inorganic polymer (Takibain #1500, manufactured by Taki Chemical Co., Ltd.), guar gum being water soluble thickening polysaccharides was used.

[Production of Sample 214]

Sample 214 was produced by the method of coating 10 layer simultaneously in the same way as that in Sample 212 except that the following high refractive index layer coating liquid 214 was used to form a high refractive index layer 214 in place of the high refractive index layer coating liquid 212 used for formation of the high refractive index layer 212.

(Preparation of the High Refractive Index Layer Coating Liquid 214)

The high refractive index layer coating liquid 214 was prepared in the same way as that in the high refractive index layer coating liquid 212 except that in place of the water-soluble inorganic polymer (Takibain #1500, manufactured by Taki Chemical Co., Ltd.), acid-treated pig skin gelatin was used.

[Production of Sample 215]

Sample 215 was produced by the method of coating 10 layer simultaneously in the same way as that in Sample 212 except that the following high refractive index layer coating liquid 215 was used to form a high refractive index layer 215 in place of the high refractive index layer coating liquid 212 used for formation of the high refractive index layer 212.

(Preparation of the High Refractive Index Layer Coating Liquid 215)

The high refractive index layer coating liquid 215 was prepared in the same way as that in the high refractive index layer coating liquid 212 except that in place of the water-soluble inorganic polymer (Takibain #1500, manufactured by Taki Chemical Co., Ltd.), 3.0 parts of tamarind seed gum was dissolved and 1.0 part of polyvinyl alcohol (PVA210, manufactured by Kuraray Co., Ltd.) were used by being dissolved.

[Production of Sample 216]

Sample 216 was produced by the method of coating 10 layer simultaneously in the same way as that in Sample 212 except that the following high refractive index layer coating liquid 216 was used to form a high refractive index layer 216 in place of the high refractive index layer coating liquid 212 used for formation of the high refractive index layer 212.

(Preparation of the High Refractive Index Layer Coating Liquid 216)

The high refractive index layer coating liquid 216 was prepared in the same way as that in the high refractive index layer coating liquid 212 except that in place of the water-soluble inorganic polymer (Takibain #1500, manufactured by Taki Chemical Co., Ltd.), 1.0 part of a water-soluble inorganic polymer (Takibain #1500, manufactured by Taki Chemical Co., Ltd.) and 3.0 parts of tamarind seed gum being water-soluble thickening polysaccharides were used by being dissolved.

[Evaluation of a Near-Infrared Reflective Film]

In accordance with the following procedures, measurement of characteristics and evaluation of performance were performed for each of the near-infrared reflective films produced in the above.

(Measurement of the Average Refractive Index of Each Layer)

A sample was prepared for each refractive index layer to be subjected to measurement of refractive index such that the each refractive index layer was formed as a single layer on a base board. Successively, the sample was cut into a size of 10 cm×10 cm, and the refractive index was determined in accordance with the following method.

The reverse surface of each Sample at the measurement side was subjected to surface roughening treatment, and then further to light absorbing treatment with a black spray so that the reverse surface was configured to prevent light from reflecting. The reflectance ratio at 25 points for each Sample in a visible light region (400 nm to 700 nm) on the condition of 5 degree regular reflection was measured by use of U-4000 type (manufactured by Hitachi, Ltd.) as a spectrophotometer, and then the average value of the measured values of the 25 points was obtained and a average refractive index was determined for each Sample from the measurement results.

In this connection, in the sample of the high refractive index layer in Sample 201, aggregated particles existed too many in the coated film so that the refractive index was not able to be measured.

(Evaluation of Refractive Index Unevenness)

The each near-infrared reflective film produced in the above was cut into a size of 10 cm×10 cm, and the cut sample was provided with a mark in vertical and horizontal directions with an interval of 2 cm by 5 ×5 so as to form 25 blocks in total. Subsequently, the sample of each near-infrared reflective film was observed in a direction to face the front surface and in a diagonal direction at an angle of 45 degrees so as to check existence or non-existence of interference unevenness caused by refractive index unevenness in the plane. The observation results were evaluated in terms of refractive index unevenness resistance in plane in accordance with the following criterion.

5: No interference unevenness was observed in all of the 25 blocks.

4: Weak interference unevenness was observed in one block among the 25 blocks.

3: Interference unevenness was observed in a range of 2 to 5 blocks among the 25 blocks.

2: Interference unevenness was observed in a range of 6 to 10 blocks among the 25 blocks.

1: Strong interference unevenness was observed in 11 blocks or more among the 25 blocks.

The measurement result and evaluation result obtained in the above are shown in Table 6.

[Evaluation of durability]

Samples 201 to 216 were irradiated with light with a irradiance of 1 kW/m$^2$ for 100 hours with a metal halide lamp type weather meter (M6T, manufactured by Suga Test Instruments Co., Ltd.), and changes in haze value and coloring before and after the irradiation were evaluated. The haze value was measured with a Haze meter, the coloring was checked by visual evaluation, and the results were judged based on the following criterion.

AA: The change in haze value was 0.1 or less, and no coloring was observed.

A: The change in haze value was 0.1 to 1.0, and no coloring was observed.

B: The change in haze value was 1.0 to 5.0, and coloring was observed slightly.

C: The change in haze value was 5.0 or more, and coloring was observed appreciably.

The evaluation results are shown in Table 6.

(Evaluation of Flexibility)

Each of the near-infrared reflective films produced in the above was subjected to a bending test to bend a sample by 30 times by use of a bending tester type 1 (Type: IMC-AOF2, Mandrel diameter: 20 mm, manufactured by Imoto Machinery Co., Ltd.) in accordance with a bending test method in accordance with JIS K5600-5-1. Subsequently, the film surface after the bending test was evaluated by visual observation.

AA: neither a folding trace nor a crack was observed on the surface of the near-infrared reflective film A: a folding trace was slightly observed on the surface of the near-infrared reflective film B: A minute crack was slightly observed on the surface of the near-infrared reflective film.

C: Many clear cracks took place on the surface of the near-infrared reflective film.

The evaluation results obtained in the above are shown in Table 6.

TABLE 6

| Sample No. | Comparative or inventive | High reflective index layer constitution | | | | Low reflective index layer constitution | | High reflective index layer reflective index | Low reflective index layer reflective index | Durability | Reflective index un-evenness | Flexibility |
|---|---|---|---|---|---|---|---|---|---|---|---|---|
| | | Titanium oxide particle | Amino acid Kind | Isoelectric point | Water-soluble polymer | Particle | Water-soluble polymer | | | | | |
| 201 | Comparative | ** 1 | Nil | | PVA235 | *5 | PVA235 | ND | 1.45 | C | 1 | B |
| 202 | Comparative | ** 2 | Serine | 5.68 | Nil | *5 | PVA235 | 1.94 | 1.45 | B | 3 | C |
| 203 | Inventive | ** 1 | Serine | 5.68 | PVA235 | *5 | PVA235 | 1.95 | 1.45 | A | 4 | A |
| 204 | Inventive | ** 1 | Serine | 5.68 | HAS-1 | *5 | PVA235 | 1.95 | 1.45 | A | 4 | A |
| 205 | Inventive | ** 1 | Serine | 5.68 | ZC-2 | *5 | PVA235 | 1.95 | 1.45 | A | 4 | A |
| 206 | Inventive | ** 1 | Serine | 5.68 | #1500 | *5 | PVA235 | 1.95 | 1.45 | A | 4 | A |
| 207 | Inventive | ** 1 | Serine | 5.68 | *1 | *5 | PVA235 | 1.95 | 1.45 | A | 5 | AA |
| 208 | Inventive | ** 1 | L-cysteine | 5.05 | *1 | *5 | PVA235 | 1.93 | 1.45 | A | 4 | AA |
| 209 | Inventive | ** 1 | Glycine | 5.97 | *1 | *5 | PVA235 | 1.95 | 1.45 | A | 5 | AA |
| 210 | Inventive | ** 1 | Proline | 6.3 | *1 | *5 | PVA235 | 1.94 | 1.45 | A | 4 | AA |
| 211 | Inventive | ** 1 | Serine | 5.68 | *2 | *5 | PVA235 | 1.95 | 1.45 | AA | 5 | AA |
| 212 | Inventive | ** 2 | Serine | 5.68 | #1500 | *5 | *1 | 1.94 | 1.48 | AA | 4 | A |
| 213 | Inventive | ** 2 | Serine | 5.68 | Guar gum | *5 | *1 | 1.94 | 1.48 | A | 4 | A |
| 214 | Inventive | ** 2 | Serine | 5.68 | *3 | *5 | *1 | 1.94 | 1.48 | A | 4 | AA |
| 215 | Inventive | ** 2 | Serine | 5.68 | *4 | *5 | *1 | 1.94 | 1.48 | AA | 5 | AA |
| 216 | Inventive | ** 2 | Serine | 5.68 | *2 | *5 | *1 | 1.94 | 1.48 | AA | 5 | AA |

ND: measurement was impossible,
*1: Tamarind seed gum,
*2: #1500 + (tamarind seed gum)
*3: Acid-treated pig skin gelatin,
*4: (Tamarind seed gum) + PVA210,
*5: Silicadol 20P,
**: TiO$_2$ particle sol It turns out that as being clear from Table 6, the near-infrared reflective film produced by the procedures of the present invention is excellent in durability and flexibility.

Example 6

[Production of a Near-Infrared Reflector 201]

A near-infrared reflector 201 was produced using the respective near-infrared reflective film of Sample 203 produced in the Example 5. That is, the near-infrared reflector 201 was produced in such a way that the respective near-infrared reflective film of Sample 203 was pasted on a transparent acrylic resin plate with a thickness of 5 mm and a size of 20 cm×20 cm with an acrylic adhesive.

[Production of a Near-Infrared Reflector 202]

A near-infrared reflector 202 was produced using the respective near-infrared reflective film of Sample 203 produced in the Example 5. That is, the near-infrared reflector 202 was produced in such a way that two glass plates with a thickness of 2 mm and a size of 20 cm×20 cm were prepared, a polyvinyl butyral film with a thickness of 0 5 mm was disposed on both sides of the near-infrared reflective film of Sample 203 so as to form a laminated member, and the resultant laminated member was sandwiched between the two glass plates, followed by pressing and heating treatment, whereby the near-infrared reflector 202 being a glass composite was produced.

[Evaluation]

The near-infrared reflectors 201 and 202 produced in the above show examples of application of the near-infrared reflective film. Even when such reflectors are produced, the near-infrared reflective film can be utilized easily regardless of the size of the near-infrared reflector. Further, the utilization of the near-infrared reflective film enables to confirm the excellent near-infrared reflectivity.

The invention claimed is:

1. A near-infrared reflective film, comprising:
   a substrate;
   a unit constituted by a high refractive index layer and a low refractive index layer on the substrate;
   wherein the near-infrared reflective film has a refractive index difference of 0.1 or more between the high refractive index layer and the low refractive index layer both neighboring on each other,
   wherein the high refractive index layer contains 1) a rutile titanium dioxide with a volume average particle size of 100 nm or less, 2) a water soluble polymer, and 3) at least one kind of compounds A selected from the group consisting of a carboxyl group-containing compound, hydroxamic acids, and a pyridine derivative,
   wherein the water soluble polymer comprises at least one of a gelatin, a combination of a thickening polysaccharide and a water soluble polymer with a reactive functional group, a combination of a thickening polysaccharide and a gelatin, or a combination of a water soluble polymer with a reactive functional group and a gelatin, and
   wherein the combination of a thickening polysaccharide and a water soluble polymer with a reactive functional group, or the combination of a thickening polysaccharide and gelatin comprises the thickening polysaccharide 3 weight % or more to the total weight of the high refraction index layer.

2. The near-infrared reflective film according to claim 1, wherein the compound A has a partial structure represented by General Formula (1) or (2) described below,

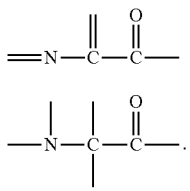

General Formula (1)

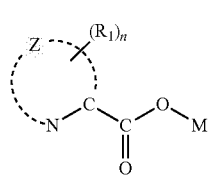

General Formula (2)

3. The near-infrared reflective film according to claim 1, wherein the compound A is a compound represented by General Formula (3) described below, General Formula (3)

in the above formula, Z represents a carbon atom or an atomic group required to form a five member ring or a six member ring together with a carbon atom; M represents a hydrogen atom, an alkali metal atom, or an ammonium group; R1 represents a hydrogen atom, a halogen atom, an alkyl group, an aryl group, an alkyl carvone amide group, an aryl carvone amide group, an alkyl sulfonamide group, an aryl sulfonamide group, an alkoxy group, an aryl oxy group, an alkylthio group, an arylthio group, an alkyl carbamoyl group, an aryl carbamoyl group, a carbamoyl group, an alkyl sulfamoyl group, an aryl sulfamoyl group, a sulfamoyl group, a cyano group, an alkyl sulfonyl group, an aryl sulfonyl group, an alkoxycarbonyl group, an aryloxy carbonyl group, an alkyl carbonyl group, an aryl carbonyl group, an acyloxy group, a carboxyl group, a carbonyl group, a sulfonyl group, an amino group, a hydroxy group, or a heterocycle group; and n represents an integer of 0 to 4.

4. The near-infrared reflective film according to claim 1, wherein the water soluble polymer is the gelatin, and contains 1) a low molecular weight gelatin or collagen peptide each having an average molecular weight of 30,000 or less in an amount of 15 weight % or more and 45 weight % or less to a total weight of the high refractive index layer, and 2) a high molecular weight gelatin having an average molecular weight of 100,000 or more in an amount of 15 weight % or more and 40 weight % or less to the total weight of the high refractive index layer.

5. A near-infrared reflector comprising the near-infrared reflective film according to claim 1 on at least one surface side of a substrate.

6. The near-infrared reflective film according to claim 1, wherein the high refractive index layer contains the water-soluble polymer, and the low refractive index layer contains another water-soluble polymer different from the water-soluble polymer contained in the high refractive index layer.

7. The near-infrared reflective film according to claim 6, wherein the water-soluble polymer contained in the high refractive index layer comprises a polyvinyl alcohol.

8. The near-infrared reflective film according to claim 7, wherein the water-soluble polymer contained in the low refractive index layer comprises another polyvinyl alcohol different from the polyvinyl alcohol contained in the high refractive index layer.

9. The near-infrared reflective film according to claim 8, wherein the near-infrared reflective film has a region with a reflectance of exceeding 50% in a region with a wavelength of 900 to 1400 nm.

10. The near-infrared reflective film according to claim 1, wherein the compound A in the high refractive index layer is added at an amount in a range of 0.2 to 1.0 g per 1.0 g of the titanium oxide.

11. A near-infrared reflective film producing method for producing a near-infrared reflective film which includes at least one unit constituted by a high refractive index layer and a low refractive index layer on a substrate and has a refractive index difference of 0.1 or more between the high refractive index layer and the low refractive index layer both neighboring on each other, comprising:
    forming the high refractive index layer by use of a high refractive index layer coating liquid which contains 1) a rutile titanium dioxide with a volume average particle size of 100 nm or less, 2) a water soluble polymer, and 3) at least one kind of compounds A selected from the group consisting of a carboxyl group-containing compound, hydroxamic acids, and a pyridine derivative,
    wherein the water soluble polymer comprises at least one of a gelatin, a combination of a thickening polysaccharide and a water soluble polymer with a reactive functional group, a combination of a thickening polysaccharide and a gelatin, or a combination of a water soluble polymer with a reactive functional group and a gelatin, and
    wherein the combination of a thickening polysaccharide and a water soluble polymer with a reactive functional group, or the combination of a thickening polysaccharide and gelatin comprises the thickening polysaccharide 3 weight % or more to the total weight of the high refraction index layer.

12. The near-infrared reflective film producing method according to claim 11, wherein the high refractive index layer coating liquid contains, as the water-soluble polymer, 1) a low molecular weight gelatin or collagen peptide each having an average molecular weight of 30,000 or less in an amount of 15 weight % or more and 45 weight % or less to a total weight of the high refractive index layer, and 2) a high molecular weight gelatin having an average molecular weight of 100,000 or more in an amount of 15 weight % or more and 40 weight % or less to the total weight of the high refractive index layer.

13. The near-infrared reflective film producing method according to claim 11, wherein the high refractive index layer is formed by use of a high refractive index layer coating liquid that contains a water-based sol which contains the rutile titanium dioxide with a volume average particle size of 100 nm or less and has a pH of 1.0 or more and 3.0 or less and a positive zeta potential, amino acids with an isoelectric point of 6.5 or less as the compound A, and the water soluble polymer.

14. The near-infrared reflective film producing method according to claim 11, wherein the high refractive index layer and the low refractive index layer are laminated by coating the high refractive index layer coating liquid and the low refractive index layer coating liquid simultaneously in multiple layers.

15. The near-infrared reflective film producing method according to claim 14, wherein the high refractive index layer contains the water-soluble polymer, and the low refractive index layer contains another water-soluble polymer different from the water-soluble polymer contained in the high refractive index layer.

16. The near-infrared reflective film producing method according to claim 15, wherein the water-soluble polymer contained in the high refractive index layer comprises a polyvinyl alcohol.

17. The near-infrared reflective film producing method according to claim 16, wherein the water-soluble polymer contained in the low refractive index layer comprises another polyvinyl alcohol different from the polyvinyl alcohol contained in the high refractive index layer.

\* \* \* \* \*